(12) United States Patent
Ochi et al.

(10) Patent No.: US 7,791,738 B2
(45) Date of Patent: Sep. 7, 2010

(54) THREE-DIMENSIONAL SHAPE MEASURING DEVICE, AND PORTABLE MEASURING DEVICE

(75) Inventors: Keizou Ochi, Takatsuki (JP); Koji Yamamoto, Kawanishi (JP); Toshio Norita, Mishima-gun (JP)

(73) Assignee: Konica Minolta Sensing, Inc., Sakai-shi (JP)

( * ) Notice: Subject to any disclaimer, the term of this patent is extended or adjusted under 35 U.S.C. 154(b) by 289 days.

(21) Appl. No.: 12/008,883

(22) Filed: Jan. 15, 2008

(65) Prior Publication Data

US 2008/0170238 A1      Jul. 17, 2008

(30) Foreign Application Priority Data

Jan. 17, 2007   (JP)   ............................. 2007-008069

(51) Int. Cl.
*G01B 11/00*   (2006.01)
(52) U.S. Cl. ..................................... 356/610
(58) Field of Classification Search ........................ None
See application file for complete search history.

(56) References Cited

U.S. PATENT DOCUMENTS

| | | | |
|---|---|---|---|
| 6,480,287 B2 | 11/2002 | Lee et al. | 356/607 |
| 6,862,097 B2 * | 3/2005 | Yanagisawa et al. | 356/602 |
| 7,139,073 B1 * | 11/2006 | Terada | 356/317 |

FOREIGN PATENT DOCUMENTS

JP        08-233520 A       9/1996

* cited by examiner

*Primary Examiner*—Tu T Nguyen
(74) *Attorney, Agent, or Firm*—Sidley Austin LLP

(57) ABSTRACT

A three-dimensional shape measuring device for measuring a three-dimensional shape of a measurement object using a light section method includes: a slit beam generator for generating a slit beam of a fan-like shape; a light projecting optical system for projecting the slit beam toward the measurement object; and an imaging section including a light receiving plane for forming light reflected on the measurement object including the slit beam, wherein the light projecting optical system includes an extended optical path for extending a slit length of the slit beam near the imaging section to a predetermined length.

16 Claims, 22 Drawing Sheets

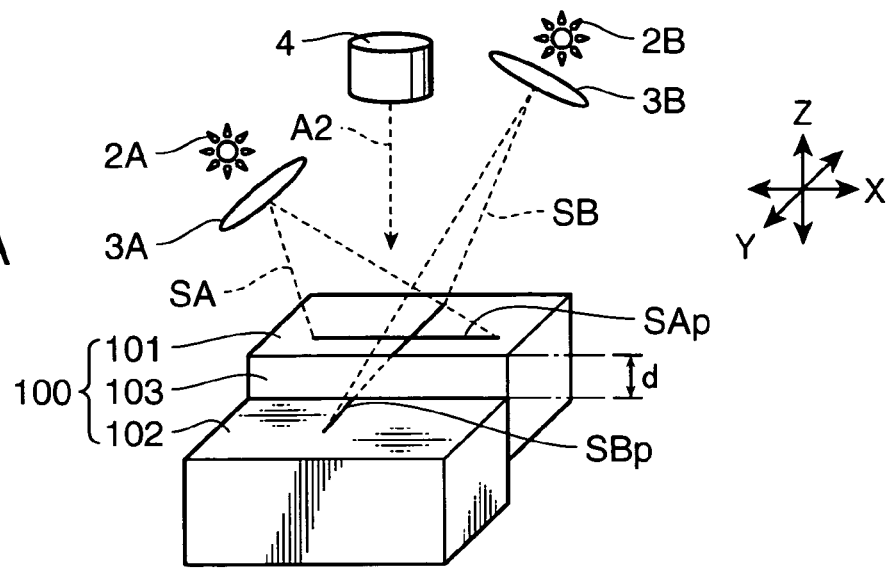
FIG.5A
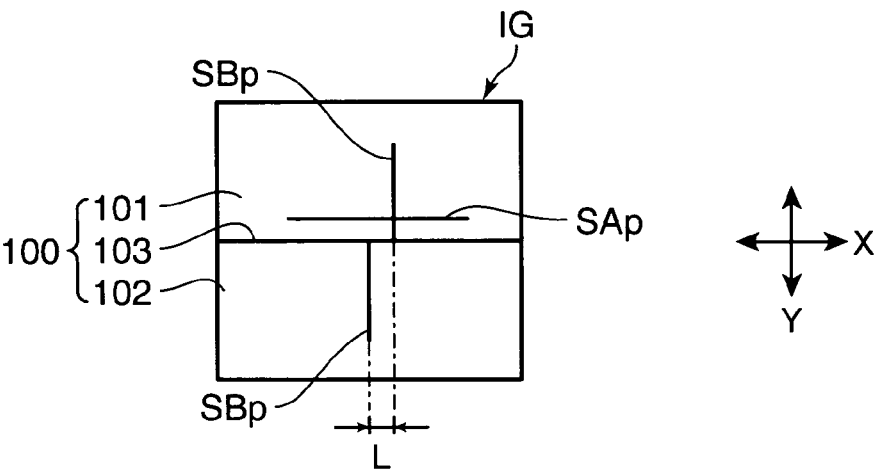
FIG.5B
FIG.6
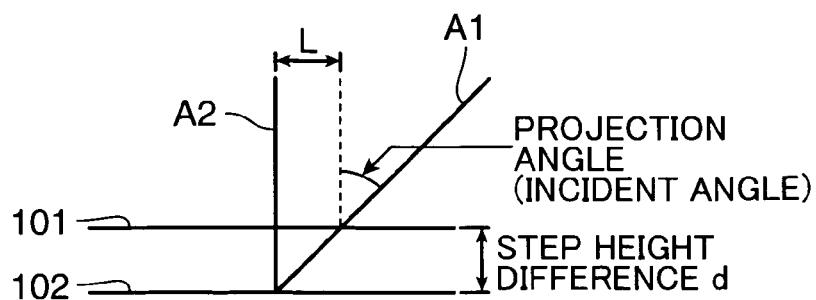
$d = L/\tan\alpha$
WHEN $\alpha = 45°$
$d = L$
WHEN $\alpha = 60°$
$d = L/\sqrt{3}$

THREE-DIMENSIONAL SHAPE MEASURING DEVICE, AND PORTABLE MEASURING DEVICE

This application is based on Japanese Patent Application No. 2007-8069 filed on Jan. 17, 2007, the contents of which are hereby incorporated by reference.

BACKGROUND OF THE INVENTION

1. Field of the Invention

The present invention relates to a three-dimensional shape measuring device for measuring a three-dimensional shape of an object to be measured (hereinafter, called as a "measurement object") using a light section method, and a portable measuring device incorporated with the three-dimensional shape measuring device.

2. Description of the Related Art

There are known instruments such as a caliper and a micrometer for measuring the length of a measurement object while being hand-held by the user. These instruments are superior in operability because the user can manipulate the instrument while holding the instrument with his or her hand. The instruments, however, fundamentally need contact with the measurement object for measurement. There is also known a device for non-contactly measuring the length of a measurement object using an optical method. For instance, Japanese Unexamined Patent Publication No. Hei 8-233520 (D1) discloses a three-dimensional shape measuring device using a light section method. Currently marketed three-dimensional shape measuring devices, however, are generally large in size, and most of the devices are fixedly installed.

For instance, for dental treatment, accurate measurement of the shape of a tooth is required to form a tooth crown. In non-contactly measuring the shape of a tooth, users will find it convenient, if the measuring device is so designed as to be operable like a caliper or a micrometer. U.S. Pat. No. 6,480,287 (D2) discloses a handy three-dimensional shape measuring device using a light section method in order to satisfy the demand.

The three-dimensional shape measuring device using a light section method is operative to convert light such as a laser beam emitted from a point light source into a fan-shaped slit beam to irradiate a measurement object. It is required to project the slit beam onto the measurement object in a state that the slit length of the slit beam is sufficiently long to cover a measurement field. In a light projecting optical system covering from the point light source to the measurement object, a certain optical path length is required to secure a certain slit length.

In the three-dimensional shape measuring device disclosed in D2, a light projecting optical system including a light source is disposed on the measurement object side, and a light receiving optical system is disposed on the back side of the measurement object. In this optical arrangement, if miniaturization of the three-dimensional shape measuring device is attempted to realize a handy operation like a caliper or a micrometer, it is difficult to secure an optical path length capable of sufficiently extending the slit length. The slit length may be extended by a relatively short optical path length, if a lens having a strong optical power is disposed in the light projecting optical system. However, this may cause a distortion in a slit image, or make the lens designing infeasible or less feasible.

SUMMARY OF THE INVENTION

In view of the above problems residing in the conventional art, it is an object of the present invention to provide a light-section type three-dimensional shape measuring device having an optical arrangement compatible with miniaturization of the device, and a portable measuring device incorporated with the three-dimensional shape measuring device.

A three-dimensional shape measuring device for measuring a three-dimensional shape of a measurement object using a light section method includes: a slit beam generator for generating a slit beam of a fan-like shape; a light projecting optical system for projecting the slit beam toward the measurement object; and an imaging section including a light receiving plane for forming light reflected on the measurement object including the slit beam, wherein the light projecting optical system includes an extended optical path for extending a slit length of the slit beam near the imaging section to a predetermined length.

These and other objects, features and advantages of the present invention will become more apparent upon reading the following detailed description along with the accompanying drawings.

BRIEF DESCRIPTION OF THE DRAWINGS

FIG. 5A is a schematic diagram for describing a measurement principle using a light section method.

FIG. 5B is a plan view of an image of the measurement object to be captured under the condition that the measuring elements of the measuring device are disposed at the positions shown in FIG. 5A.

FIG. 6 is a schematic diagram for describing a projection angle of a projecting optical axis.

DETAILED DESCRIPTION OF THE PREFERRED EMBODIMENTS

Figure 1:
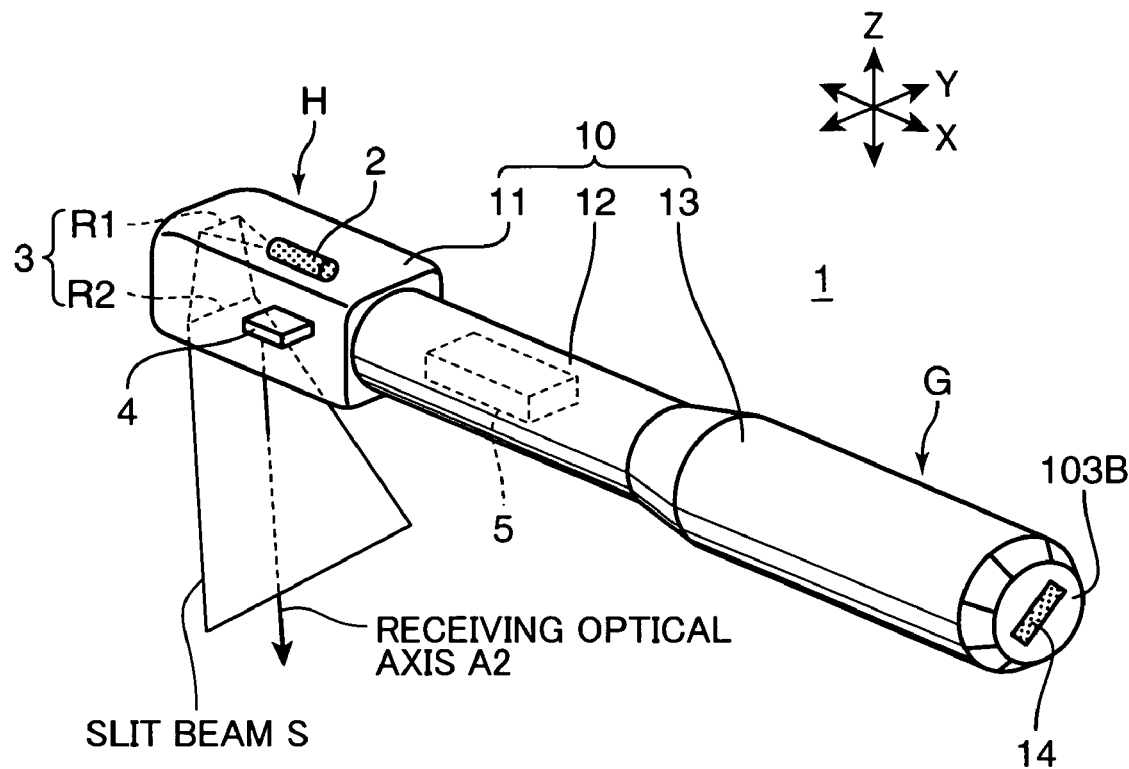
FIG. 1 is a perspective view of a portable three-dimensional shape measuring device embodying the invention.

In the following, embodiments of the invention are described in detail referring to the drawings.

(Description on Outline and Measurement Principle of Portable Three-dimensional Shape Measuring Device)

Figure 2:
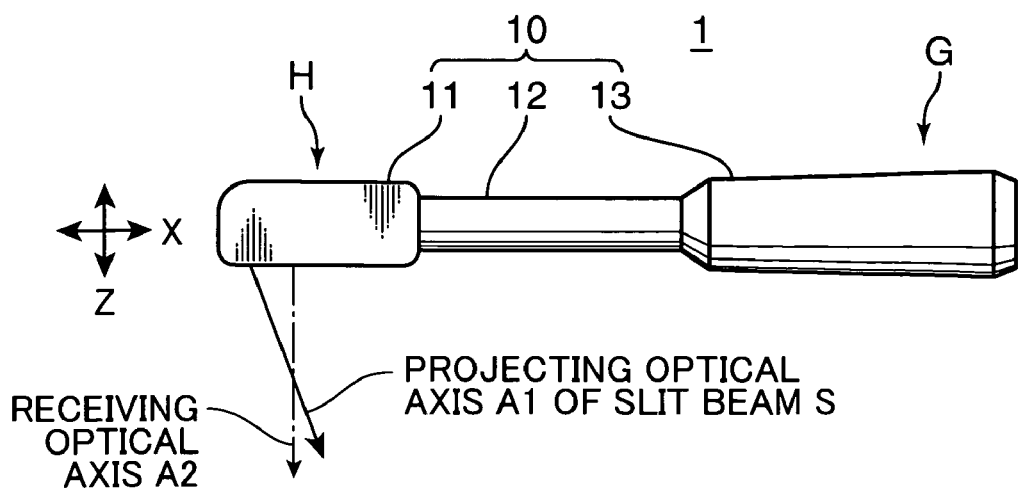
FIG. 2 is a side view of the measuring device shown in FIG. 1.
Figure 3:
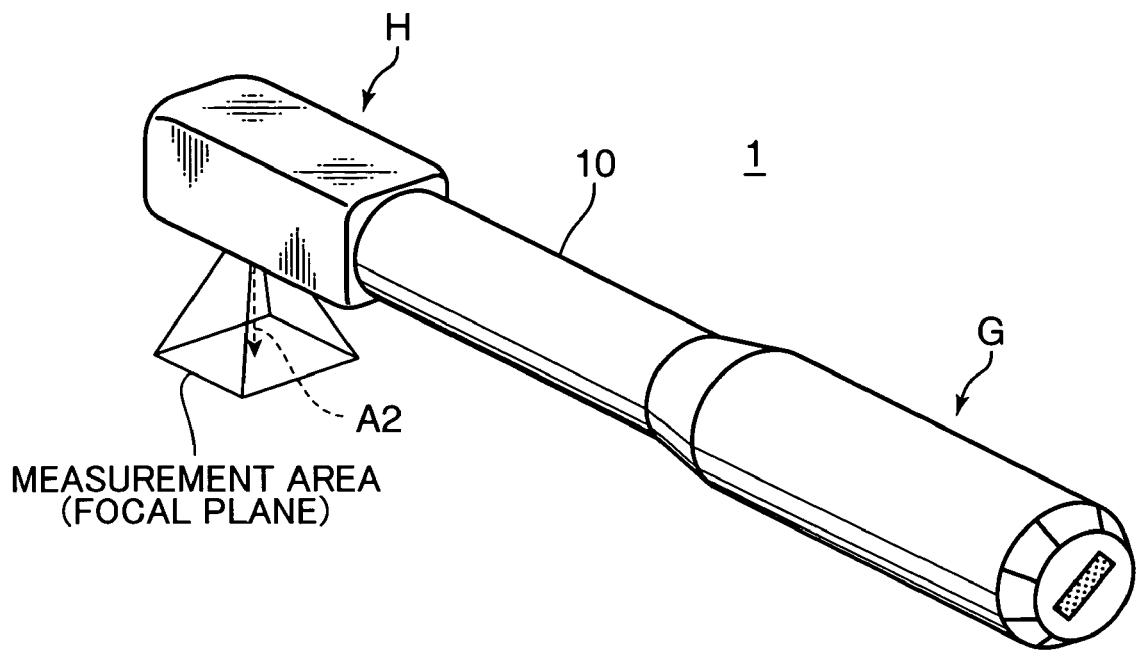
FIG. 3 is a perspective view of the measuring device shown in FIG. 1, depicting a measurement area to be measured by the measuring device.
Figure 4:
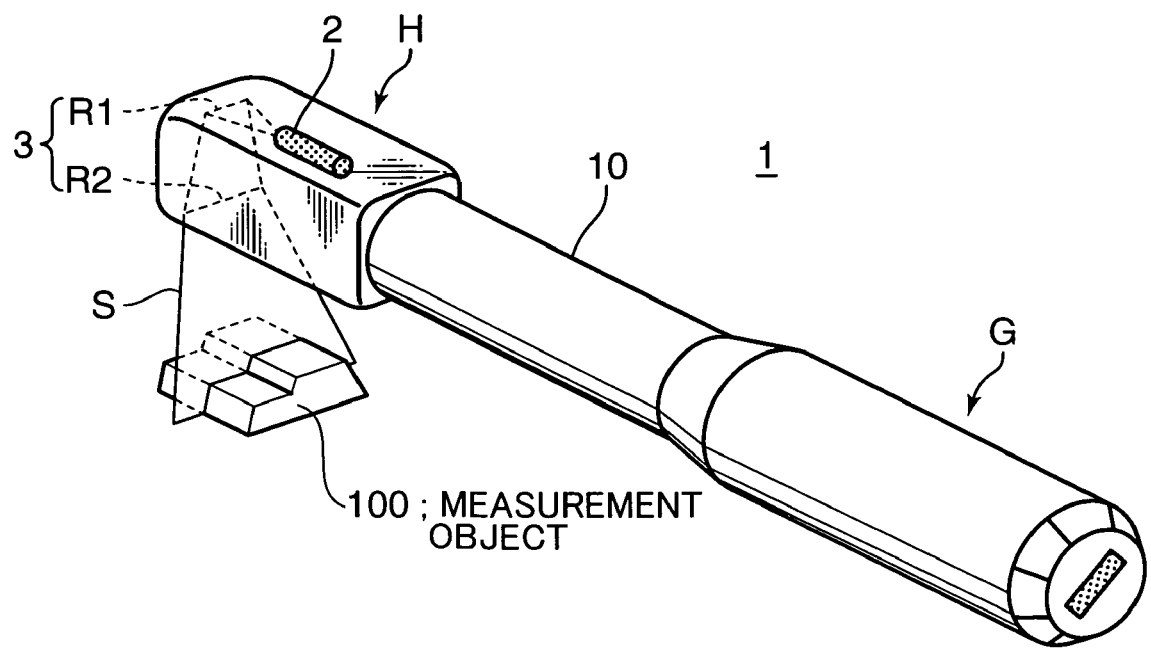
FIG. 4 is a perspective view of the measuring device shown in FIG. 1, depicting a manner of projecting a slit beam onto a measurement object.

FIG. 1 is a perspective view of a portable three-dimensional shape measuring device 1 embodying the invention, and FIG. 2 is a side view thereof. FIG. 3 is a perspective view of the measuring device 1, showing a measurement area to be measured by the measuring device 1. FIG. 4 is a perspective view of the measuring device 1, showing a manner of projecting a slit beam S onto a measurement object 100. The measuring device 1 measures a three-dimensional shape of the measurement object 100 using a light section method. The measuring device 1 includes a main body housing 10; and a slit beam generator 2, a light projecting optical system 3, an imaging section 4, and a controller 5, all of which are housed in the main body housing 10. The measuring device 1 has a rod-like shape with the dimensions substantially the same as those of a general caliper. One end of the measuring device 1 serves as a measurement head H for projecting and receiving a slit beam S, and the other end thereof serves as a grip portion G to be held by a user.

As shown in FIG. 1, the main body housing 10 is a housing integrally formed of a head housing portion 11 corresponding to the measurement head H, an intermediate housing portion 12, and a grip housing portion 13 corresponding to the grip portion G. The head housing portion 11 has a rectangular shape in plan view. The slit beam generator 2, the light projecting optical system 3, and the imaging section 4, as measuring elements essentially required for three-dimensional shape measurement, are encased in the head housing portion 11. The controller 5 for controlling operations of the measuring elements is mounted in the intermediate housing portion 12. The grip housing portion 13 has a cylindrical shape for providing the user with a handy operation. An unillustrated power battery or a like device is encased in the grip housing portion 13. A USB terminal 14 is attached to a distal end 103B of the grip housing portion 13 to communicate data with an external device. Surface roughness is formed on an outer surface of the grip housing portion 13 to prevent slippage during use.

The slit beam generator 2 generates a slit beam S of a fan-like shape to project the slit beam S onto the measurement object 100. The slit beam generator 2 includes a point light source such as an LD (laser diode), an LED (light-emitting diode), or a lamp; and an optical component for converting a light beam emitted from the point light source into a slit beam. Examples of the optical component are a cylindrical lens, a cylindrical column lens, and a slit plate. The slit beam generator 2 is disposed on the back side of a light receiving plane of the imaging section 4. This arrangement contributes to miniaturization of the measurement head H in X-direction in FIG. 1.

The light projecting optical system 3 projects the slit beam S onto the measurement object 100 (see FIG. 4). Specifically, the light projecting optical system 3 has an extended optical path for guiding the slit beam S toward the front side of the imaging section 4, while passing the slit beam S emitted from the slit beam generator 2 disposed on the back side of the light receiving plane of the imaging section 4 around the imaging section 4.

The light projecting optical system 3 has at least one reflecting plane for reflecting the slit beam S. The at least one reflecting plane is disposed at a position substantially on the same height as the light receiving plane of the imaging section 4, or farther from the light receiving plane, viewed from the measurement object 100. This arrangement is advantageous in extending the optical path from the slit beam generator 2 to the measurement object 100, thereby enabling to secure a sufficiently long slit length of the slit beam S without using a lens of a strong optical power, even in use of a compact measurement head H. In this embodiment, the light projecting optical system 3 has two reflecting planes R1 and R2, wherein the reflecting plane R1 is disposed at a position farther from the light receiving plane of the imaging section 4.

The imaging section 4 includes a two-dimensional image sensor e.g. a CCD (charge coupled device) area sensor, and a light receiving optical system for forming light reflected on the measurement object 100 including the slit beam S onto the light receiving plane of the image sensor. The light receiving plane of the imaging section 4 is disposed in parallel with the measurement object 100. It should be noted that the parallel arrangement is that the light receiving plane is in parallel with an imaginary measurement plane where the measurement object is disposed. This arrangement will be described later in detail referring to FIG. 13. As a result of the parallel arrangement, as shown in FIG. 2, a receiving optical axis A2 of the imaging section 4 extends downwardly and perpendicularly in Z-direction. On the other hand, a projecting optical axis A1 of the slit beam S extends downwardly with a certain inclination. In other words, the projecting optical axis A1 intersects with the receiving optical axis A2 at a predetermined angle. In a light section method, intersection of optical axes is essentially required. A plane orthogonal to the intersection of the projecting optical axis A1 and the receiving optical axis A2 on the receiving optical axis A2 serves as a focal plane of the light projecting optical system and the light receiving optical system. FIG. 3 shows a measurement area i.e. a focal plane, which corresponds to an imaging area of the imaging section 4.

The controller 5 includes a CPU (central processing unit), and various circuits. The controller 5 controls an emission operation of the slit beam generator 2, an imaging operation of the imaging section 4, and the like. The configuration of the controller 5 is described later in detail referring to FIG. 14.

In the following, a measurement principle of the portable three-dimensional shape measuring device 1, in other words, a measurement principle using a light section method is described. FIG. 5A is a schematic diagram for describing the measurement principle using the light section method. In this embodiment, the measurement principle is described on a case that a slit beam SA extending in X-direction and a slit beam SB extending in Y-direction perpendicularly intersect with each other. In this embodiment, the measurement object 100 has a higher portion 101, a lower portion 102, and a stepped portion 103 with a height "d" as a step height difference, wherein the stepped portion 103 is defined by the higher portion 101 and the lower portion 102.

The X-direction slit beam SA is generated by an X-direction light source 2A and an X-direction slit beam projecting optical system 3A. The X-direction slit beam SA is irradiated onto the measurement object 100 in a direction inclined by a predetermined angle with respect to a normal direction to the surface of the measurement object 100, in other words, with respect to Z-direction. By projection of the X-direction slit beam SA, a projected image SAp is formed on the surface of the measurement object 100. The slit beam projecting optical system 3A includes the optical component in the slit beam generator 2, which has been described referring to FIGS. 1 through 4, for converting a light beam emitted from the point light source into a slit beam.

Similarly to the X-direction slit beam SA, the Y-direction slit beam SB is generated by a Y-direction light source 2B and a Y-direction slit beam projecting optical system 3B. Similarly to the X-direction slit beam SA, the Y-direction slit beam SB is irradiated onto the measurement object 100 in a direction inclined by a predetermined angle with respect to the normal direction to the surface of the measurement object 100. The projecting direction of the Y-direction slit beam SB is different from the projecting direction of the X-direction slit beam SA. By projection of the Y-direction slit beam SB, a projected image SBp is formed on the surface of the measurement object 100 in a direction orthogonal to the projected image SAp.

The imaging section 4 e.g. a camera is disposed at such a position as to align the receiving optical axis A2 with the normal to the sample surface. In other words, the light receiving direction of the camera 4 is oriented at a certain angle with respect to the projecting directions of the X-direction slit beam SA and the Y-direction slit beam SB. FIG. 5B is a plan view of an image IG of the measurement object 100 to be captured by the camera 4 under the condition that the measuring elements of the measuring device 1 are disposed at the positions shown in FIG. 5A. Since there is an angle difference between the light projecting direction i.e. a light section plane, and the light receiving direction, the height "d" of the stepped portion 103 can be obtained based on the captured image IG.

The measurement object 100 has a step in Y-direction. Whereas the X-direction slit beam SA is projected onto the flat surface of the higher portion 101, the Y-direction slit beam SB is projected over the surfaces of the higher portion 101 and the lower portion 102 across the stepped portion 103. As a result of the projection, whereas the projected image SAp of the X-direction slit beam SA has a continued straight line shape, the projected image SBp of the Y-direction slit beam SB has a configuration that a straight line is divided into two parts displaced from each other with respect to the stepped portion 103 by a distance L proportional to the height "d".

As shown in FIG. 6, the distance L on the captured image IG is varied depending on a projection angle i.e. an incident angle "α" of the projecting optical axis A1 with respect to the receiving optical axis A2. In other words, a relation between the height "d" and the distance L is expressed by the following mathematical expression.

$$d = L/\tan \alpha$$

If α=45 degrees, d=L. In this case, the height "d" can be derived by simply converting the scale of the distance L on the captured image IG into actual dimensions. If α=60 degrees, d=L/√3. This means a larger projection angle "a" increases the distance L corresponding to the height "d", which is advantageous in enhancing the resolution performance, despite decrease of the range of the height "d" detectable by the measuring device 1.

In use of the portable three-dimensional shape measuring device 1 having the above arrangement, similarly to a manner of operating a caliper, a user can manipulate the portable three-dimensional shape measuring device 1 by directing the measurement head H toward a targeted site of the measurement object for three-dimensional shape measurement while holding the grip portion G with his or her hand. For instance, in forming a tooth crown, the user inserts the measurement head H into the mouth of a patient while holding the grip portion G, and orients the measurement head H toward a targeted tooth for projecting and receiving a slit beam S.

First Embodiment of Measurement Head

Figure 7:
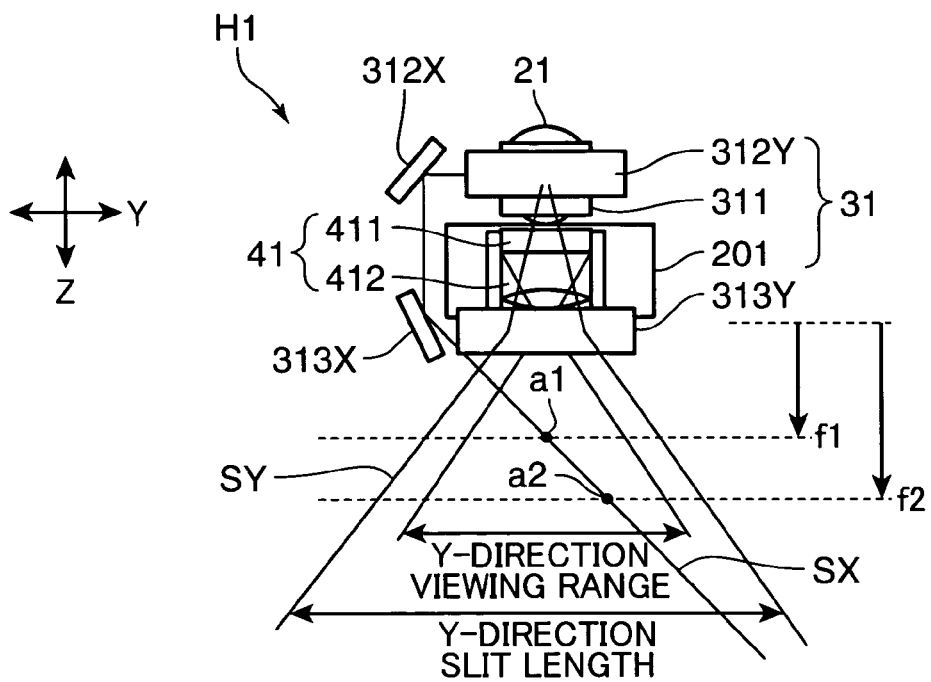
FIG. 7 is a front view of a measurement head as a first embodiment of the invention.
Figure 8:
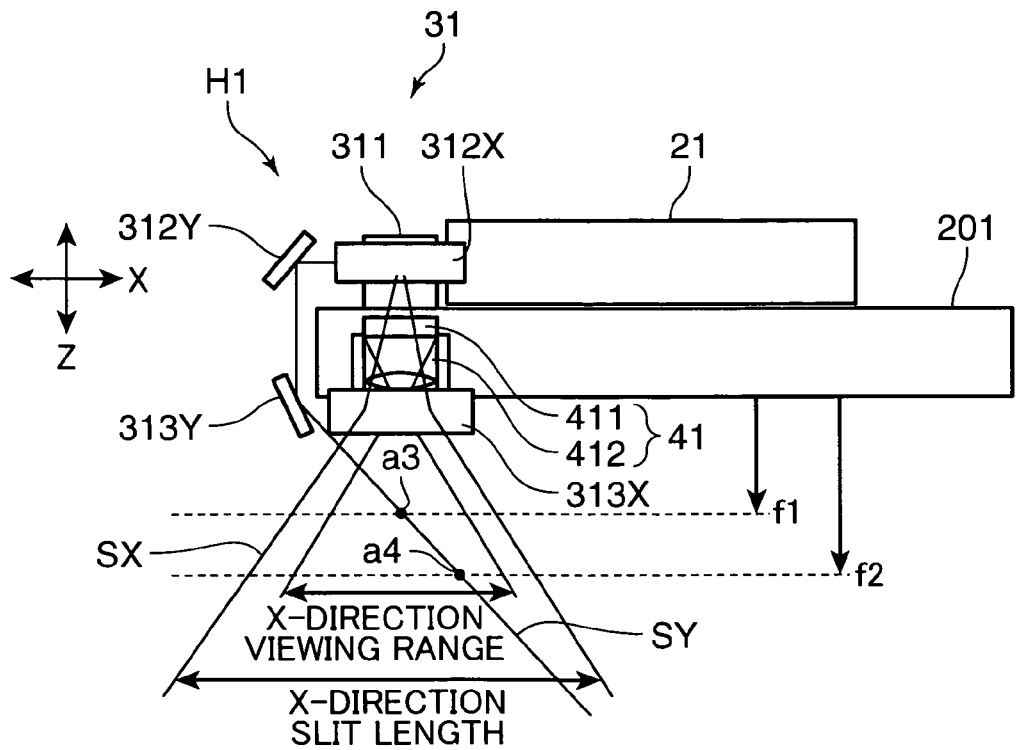
FIG. 8 is a side view of the measurement head in the first embodiment.
Figure 9:
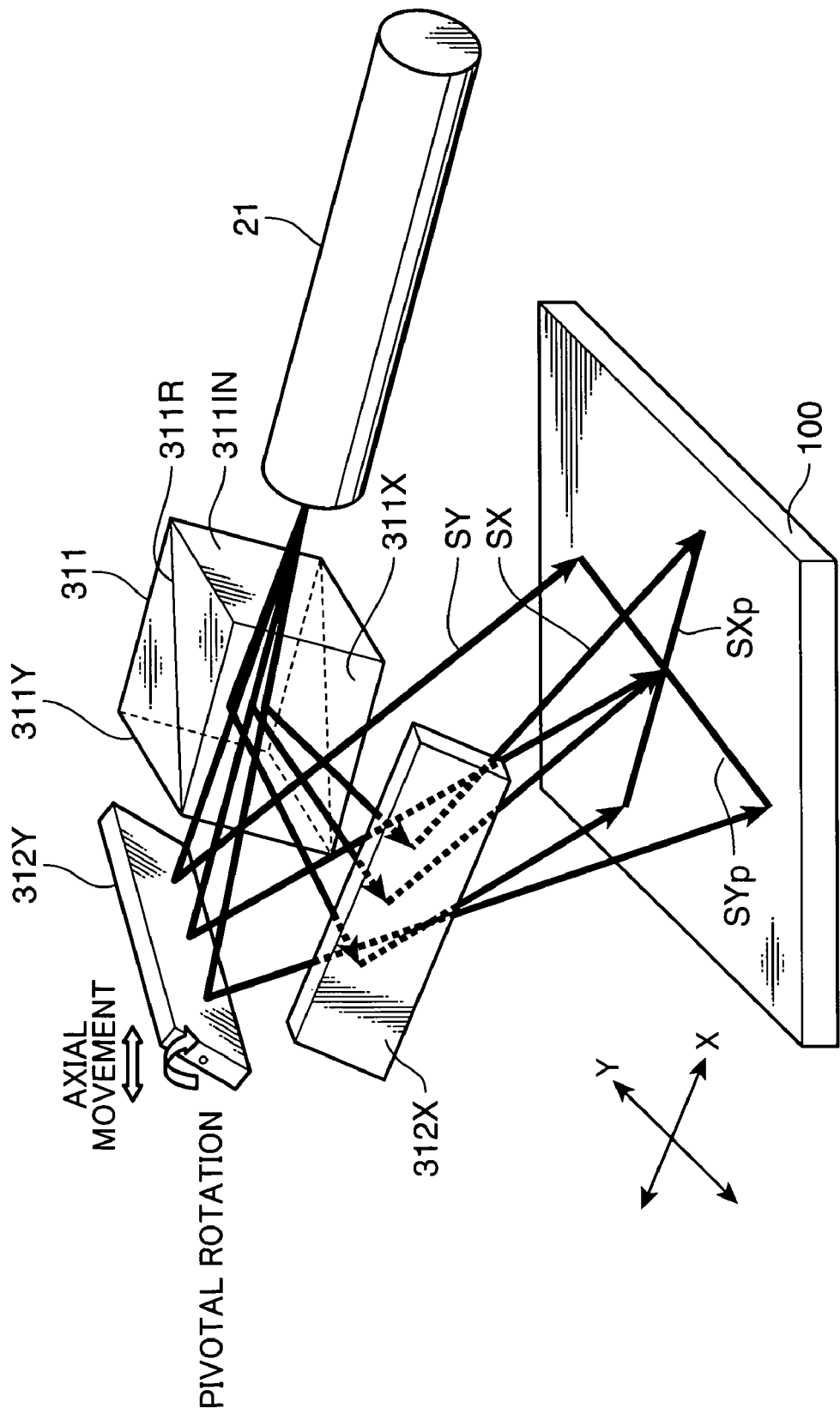
FIG. 9 is a perspective view briefly showing a manner of projecting slit beams onto a measurement object.

In this section, an embodiment of the measurement head H to be mounted in the head housing portion 11 is described. FIG. 7 is a front view of a measurement head H1 in accordance with a first embodiment, viewed from X-direction in FIG. 1. FIG. 8 is a side view of the measurement head H1, viewed from Y-direction in FIG. 1. The measurement head H1 includes a base block 201, a laser light source 21, a slit beam projecting optical system 31, and an imaging unit 41. FIG. 9 is a perspective view briefly showing a manner of projecting a slit beam onto a measurement object 100.

The laser light source 21 is e.g. a compact He—Ne laser device for generating a laser beam of a visible wavelength. Alternatively, various compact laser devices other than the laser device 21 may be used.

The slit beam projecting optical system 31 projects a laser beam emitted from the laser light source 21 onto a measurement object 100 as a slit beam of a fan-like shape. In this embodiment, the slit beam projecting optical system 31 projects an X-direction slit beam SX and a Y-direction slit beam SY perpendicularly intersecting with each other onto the measurement object 100 by splitting a laser beam into the two laser beams in different directions, whereby an X-direction projected slit image SXp and a Y-direction projected slit image SYp perpendicularly intersecting with each other are formed on the surface of the measurement object 100 (see FIG. 9).

In order to perform the aforementioned projection, the slit beam projecting optical system 31 has: a conversion optical system 310 (see FIG. 10) for converting a laser beam into a slit beam of a fan-like shape; a half prism 311, as a beam splitter, for splitting the slit beam into two laser beams in X-direction and Y-direction to generate the X-direction slit beam SX as a first slit beam, and the Y-direction slit beam SY as a second slit beam; an X-direction mirror 312X as a first reflector and an X-direction relay mirror 313X as a first relay reflector for irradiating the X-direction slit beam SX; and a Y-direction mirror 312Y as a second reflector and a Y-direction relay mirror 313Y as a second relay reflector for irradiating the Y-direction slit beam SY.

The imaging unit 41 includes an image sensor 411 having a light receiving plane for receiving light reflected on the measurement object 100 including the X-direction slit beam SX and the Y-direction slit beam SY; and a light receiving optical system 412 having a lens for forming the reflecting light on the light receiving plane of the image sensor 411. The image sensor 411 is e.g. a CCD area sensor.

In the following, positional relations among the constituent elements of the measurement head H1 are described. The imaging unit 41 is mounted on the base block 201 in such a manner that the light receiving plane of the image sensor 411 is disposed in parallel with the measurement object 100. The laser light source 21 is arranged on the back side of the imaging unit 41 in such a manner that the laser light source 21 is placed on the upper surface of the base block 201 in Z-direction of FIG. 8.

Figure 10:
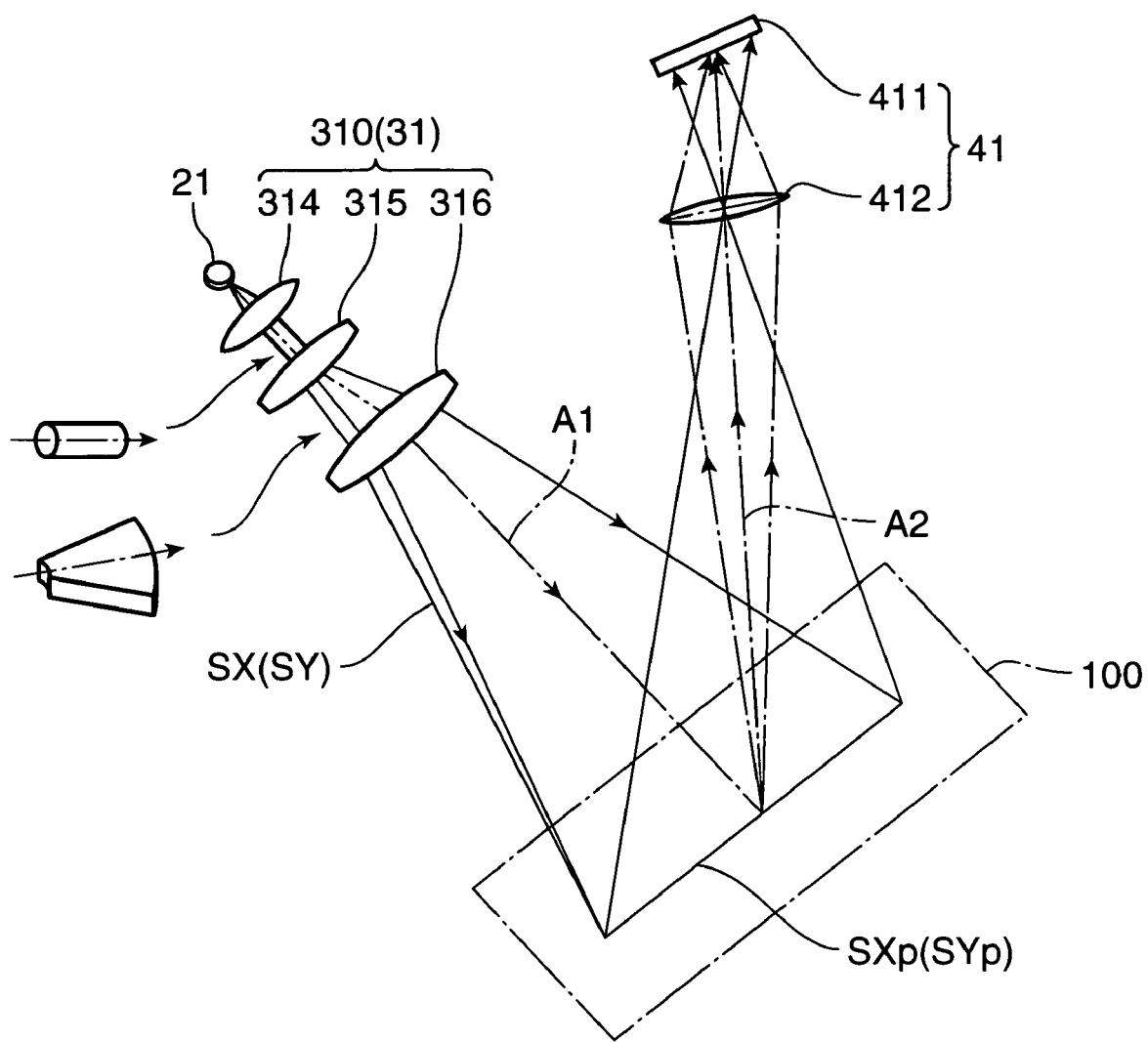
FIG. 10 is an optical path diagram showing a focus relation between a slit beam projecting optical system and a light receiving optical system.

Although not illustrated in FIGS. 7 through 9, the conversion optical system 310 of the slit beam projecting optical system 31 is arranged at a light exit end of the laser light source 21. As shown in FIG. 10, the conversion optical system 310 includes a collimator lens 314 for collimating laser light into parallel light, a first cylindrical or cylindrical column lens 315 for converting the parallel light into a slit beam of a fan-like shape; and a second cylindrical lens 316 for reducing the width of the slit beam. The positions of the first and the second cylindrical lenses 315 and 316 may be reversed. Preferably, the conversion optical system 310 may have a focal adjustor.

The half prism 311 is disposed downstream on the optical path with respect to the laser light source 21 i.e. the conversion optical system 310. In an actual arrangement, the half prism 311 is arranged immediately above the imaging unit 41. As shown in FIG. 9, the half prism 311 internally has a half reflecting plane 311R to reflect half of the laser beam incident from an incident plane 311IN by bending the laser beam at 90 degrees for exiting from a first exit plane 311X, and to propagate the other half of the laser beam for exiting from a second exit plane 311Y. The X-direction slit beam SX and the Y-direction slit beam SY are generated by the beam splitting operation of the half prism 311.

The X-direction mirror 312X is disposed near the back side of the imaging unit 41. Accordingly, the X-direction mirror 312X is disposed at a position farther from the light receiving plane of the image sensor 411, viewed from the measurement object 100. The X-direction mirror 312X is disposed as opposed to the first exit plane 311X of the half prism 311 to reflect the X-direction slit beam SX toward the measurement object 100. In other words, the X-direction slit beam SX incident from the laser light source 21 and the half prism 311 in X-direction is reflected in Z-direction.

Similarly to the X-direction mirror 312X, the Y-direction mirror 312Y is disposed near the back side of the imaging unit 41 and at a position farther from the light receiving plane of the image sensor 411. The Y-direction mirror 312Y is disposed as opposed to the second exit plane 311Y of the half prism 311 to reflect the Y-direction slit beam SY toward the measurement object 100.

A flat plane mirror having a specular reflection surface may be used as the X-direction mirror 312X and the Y-direction mirror 312Y. Alternatively, a triangular prism or a like device may be used. The X-direction mirror 312X and the Y-direction mirror 312Y are pivotable about axes extending in X-direction and Y-direction, respectively, and movable in X-axis direction and Y-axis direction, respectively, to adjust the positions of the projected images SXp and SYp.

The X-direction relay mirror 313X is disposed near the front side of the imaging unit 41. The X-direction relay mirror 313X irradiates the X-direction slit beam SX reflected on the X-direction mirror 312X toward the measurement object 100 at a predetermined angle inclined with respect to the receiving optical axis of the image sensor 411. Similarly to the X-direction relay mirror 313X, the Y-direction relay mirror 313Y is disposed near the front side of the imaging unit 41. The Y-direction relay mirror 313Y irradiates the Y-direction slit beam SY reflected on the Y-direction mirror 312Y toward the measurement object 100 at a predetermined angle inclined with respect to the receiving optical axis of the image sensor 411. A flat plane mirror having a specular reflection surface may be used as the X-direction relay mirror 313X and the Y-direction relay mirror 313Y. To simplify the illustration, in FIG. 9, the X-direction relay mirror 313X and the Y-direction relay mirror 313Y are not shown.

The intersection angle i.e. the projection angle defined by the projecting optical axis of the X-direction slit beam SX and the receiving optical axis of the image sensor 411 is made identical to the intersection angle defined by the projecting optical axis of the Y-direction slit beam SY and the receiving optical axis of the image sensor 411. The intersection angles may be e.g. 45 degrees. By making the intersection angles identical to each other, depthwise profiles in two different directions can be obtained with the same scale. This is advantageous in simplifying a computation to measure the three-dimensional shape of the measurement object.

As described above, the slit beam projecting optical system 31 has extended optical paths for guiding the slit beam toward the measurement object 100 while passing the slit beam around the back side and a lateral side of the imaging unit 41. With the provision of the extended optical paths, the X-direction slit beam SX and the Y-direction slit beam SY are projected onto the measurement object 100 with sufficiently long slit lengths, while securing miniaturization of the measurement head H1.

In the following, a focal relation between the slit beam projecting optical system 31 and the light receiving optical system 412 is described. As shown in FIG. 10, a focal position of the X-direction slit beam SX (and the Y-direction slit beam SY) by the slit beam projecting optical system 31 is coincident with a focal position defined by the light receiving optical system 412 on the light receiving plane of the image sensor 411 by the light receiving optical system 412. In FIG. 10, the X-direction mirror 312X and the X-direction relay mirror 313X having no optical power are not illustrated.

The X-direction slit beam SX is formed on the focal plane i.e. the surface of the measurement object 100 along the projecting optical axis A1. Specifically, laser light emitted from the laser light source 21 is collimated into parallel light of a circular spot by the collimator lens 314. Then, the parallel light is converted into a slit beam of a fan-like shape by the first cylindrical lens 315. The slit beam has a certain width depending on the size of the circular spot. After the conversion into the slit beam, the width of the slit beam is reduced by the second cylindrical lens 316 to thereby form the X-direction slit beam SX on the focal plane.

The light receiving optical system 412 is designed in such a manner that the focal position defined by the light receiving optical system 412 is located on the focal plane of the slit beam projecting optical system 31. In this arrangement, by focusing the X-direction slit beam SX on the measurement object 100, the image sensor 411 can detect the light reflected on the measurement object 100 in a focus state. This eliminates the need of individual focus adjustments by the slit beam projecting optical system 31 and the light receiving optical system 412, which is advantageous in enhancing the operability of the user.

Figure 11:
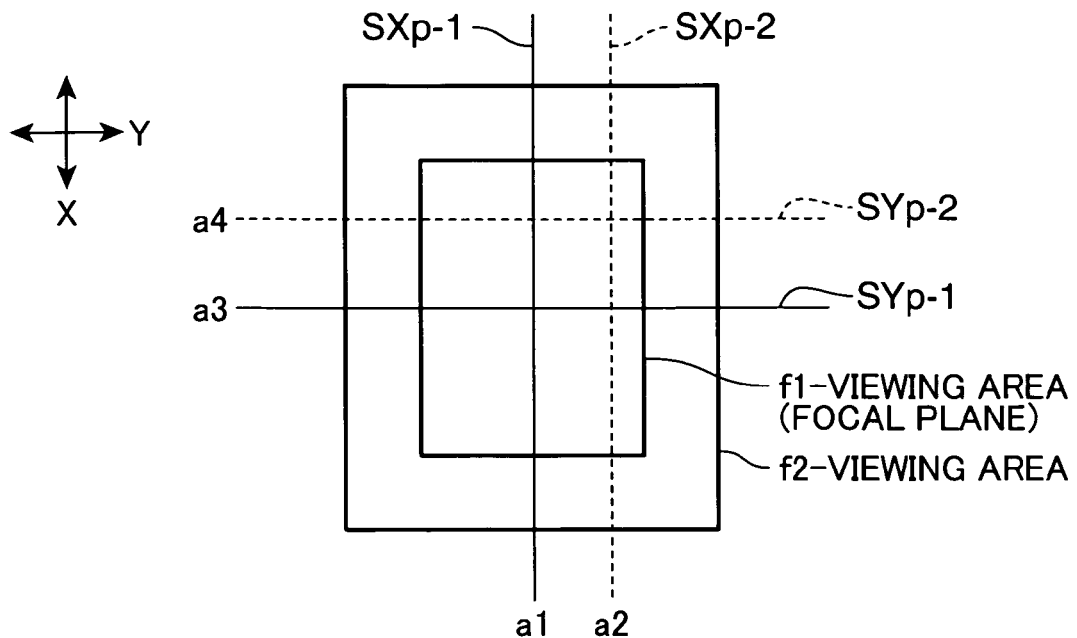
FIG. 11 is a schematic diagram for describing positions of an X-direction projected slit image and a Y-direction projected slit image in a focus state.
Figure 12:
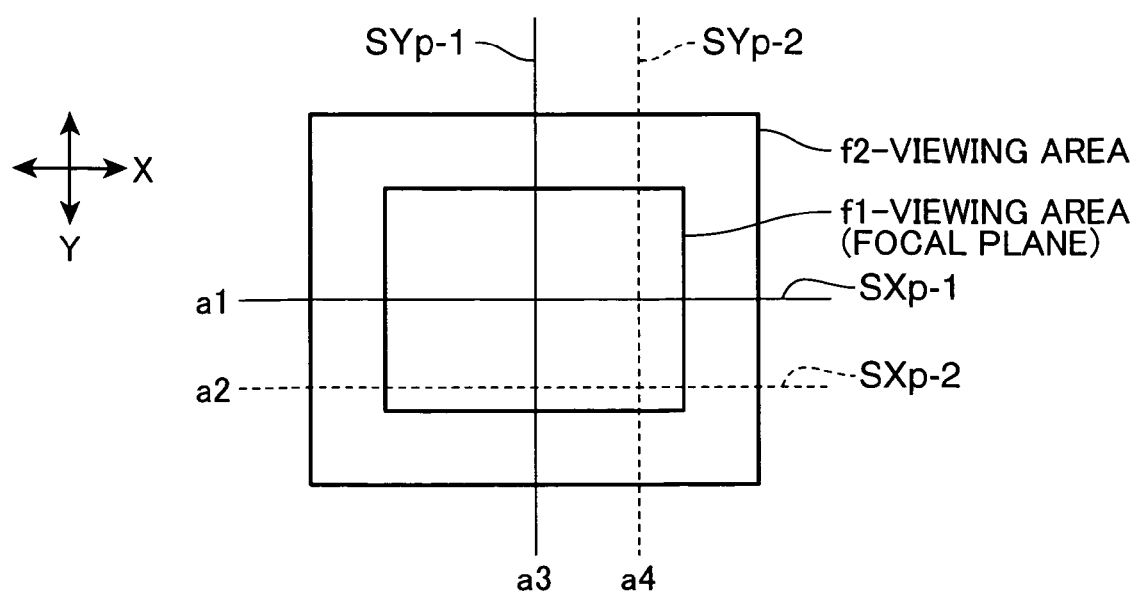
FIG. 12 is a schematic diagram for describing positions of the X-direction projected slit image and the Y-direction projected slit image in a focus state.

FIGS. 11 and 12 are schematic diagrams for describing the positions of the X-direction projected slit image SXp and the Y-direction projected slit image SYp in a focus state. As shown in FIGS. 11 and 12, the X-direction slit beam SX and the Y-direction slit beam SY in a focus state intersect with each other at a position near the center of a light receiving area of the image sensor 411.

As shown in FIGS. 7 and 8, let it be assumed that the focal length of the image sensor 411 corresponding to the focal plane is "f1", and a distance other than the focal length "f1" is "f2", where "f2" is longer than "f1". The intersection of the projecting optical axis of the X-direction slit beam SX with a viewing area (hereinafter, called as "f1-viewing area") of the image sensor 411 when the distance is "f1", is defined as "a1", and the intersection of the projecting optical axis of the X-direction slit beam SX with a viewing area (hereinafter, called as "f2-viewing area") of the image sensor 411 when the distance is "f2", is defined as "a2" (see FIG. 7). The intersection of the projecting optical axis of the Y-direction slit beam SY with the f1-viewing area, is defined as "a3", and the intersection of the projecting optical axis of the Y-direction slit beam SY with the f2-viewing area, is defined as "a4" (see FIG. 8).

The slit beam projecting optical system 31 is configured in such a manner that the intersection "a1" is located in the middle of a Y-direction viewing range in the f1-viewing area, and that the intersection "a2" is located off the middle of a Y-direction viewing range in the f2-viewing area. As a result of the arrangement, a projected image SXp-1 of the X-direction slit beam SX in the f1-viewing area is formed across the middle of the Y-direction viewing range, but a projected image SXp-2 of the X-direction slit beam SX in the f2-viewing area is formed closer to an end of the Y-direction viewing range.

The slit beam projecting optical system 31 is also configured in such a manner that the intersection "a3" is located in the middle of an X-direction viewing range in the f1-viewing area, and that the intersection "a4" is located off the middle of an X-direction viewing range in the f2-viewing area. As a result of the arrangement, whereas a projected image SYp-1 of the Y-direction slit beam SY in the f1-viewing area is formed across the middle of the X-direction viewing range, a projected image SYp-2 of the Y-direction slit beam SY in the f2-viewing area is formed closer to an end of the X-direction viewing range.

In the above arrangement, the X-direction projected slit image SXp-1 and the Y-direction projected slit image SYp-1 in the focus state intersect with each other near the center of the f1-viewing area. On the other hand, the X-direction projected slit image SXp-2 and the Y-direction projected slit image SYp-2 in a defocused state intersect with each other off the center of the f2-viewing area and at a position closer to a corner of the f2-viewing area.

In this arrangement, a user is allowed to monitor the image of the measurement object captured by the image sensor 411, and recognize that a state where the projected slit images intersect with each other at the center of the captured image indicates that the slit beam projecting optical system 31 and the light receiving optical system 412 are in a focus state. In other words, since the projected slit images are usable as a focus marker, the user is facilitated to perform a focusing operation. This is particularly useful in the case where the measurement object 100 has no texture and has a low spatial frequency such as a stereoscopic object painted with a single color.

Figure 13A:
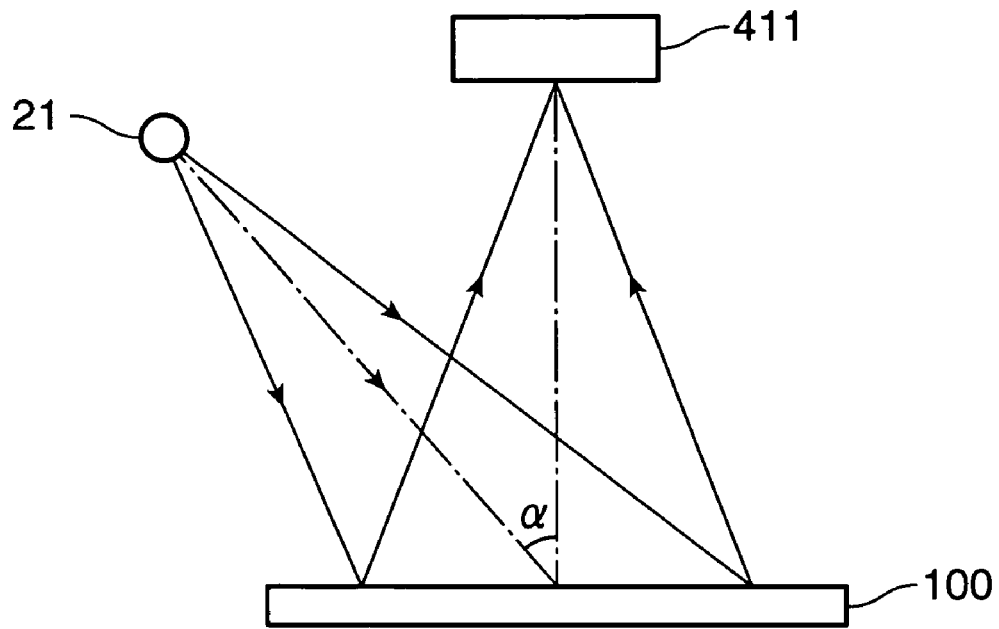
FIGS. 13A and 13B are schematic diagrams for describing a positional relation between a light receiving plane of an image sensor and a measurement object.
Figure 13B:
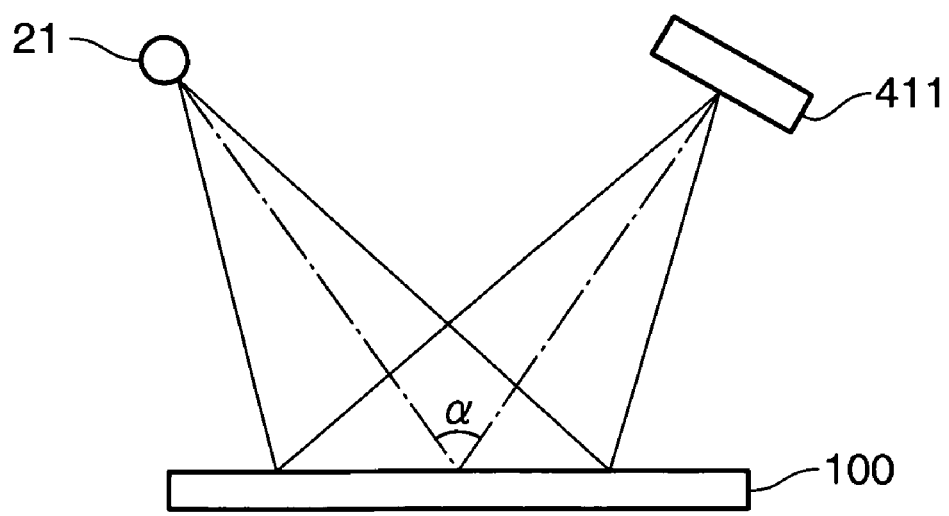

The following is a description on an effect of parallel alignment of the light receiving plane of the image sensor 411 with the measurement object 100. As described above, in the light section method, it is essentially important to define an angle difference between the light projecting direction and the light receiving direction. In principle, as far as there is an angle difference between the light projecting direction and the light receiving direction, the invention may embrace any arrangement including an arrangement as shown in FIG. 13A in which the light receiving plane of the image sensor 411 is disposed in parallel with the measurement object 100, with a slit beam being projected in an oblique direction; and an arrangement as shown in FIG. 13B in which both of the light receiving direction of the image sensor 411 and the light projecting direction of a slit beam are inclined with respect to the normal to the surface of the measurement object 100. Alternatively, an arrangement that the light projecting direction of a slit beam is aligned with the normal direction, and the light receiving direction is inclined with respect to the normal to the surface of the measurement object 100 may be applied.

However, as shown in FIG. 13B, if the light receiving plane of the image sensor 411 is not disposed in parallel with the measurement object 100, it is highly likely that a captured image may have a trapezoidal distortion or a focal displacement resulting from "aori" or shift photographing. Specifically, if the light receiving plane of the image sensor 411 is not disposed in parallel with the measurement object 100, a focal length difference in the viewing area between a wide angle end and a telephoto end is increased, which may obstruct capturing a fine image. A larger focal length difference may adversely affect the measurement precision in measuring the three-dimensional shape of the measurement object. On the other hand, as shown in FIG. 13A, if the light receiving plane of the image sensor 411 is disposed in parallel with the measurement object 100, such a large focal length difference can be avoided, thereby enabling to eliminate the drawback resulting from "aori" or shift photographing.

In use of the measurement head H1 having the above arrangement, a laser beam emitted from the laser light source 21 is converted into a slit beam of a fan-like shape by the conversion optical system 310 of the slit beam projecting optical system 31. Then, the slit beam is split into the X-direction slit beam SX and the Y-direction slit beam SY by the half prism 311. The X-direction slit beam SX passes along an extended optical path defined by the X-direction mirror 312X and the X-direction relay mirror 313X for projection onto the measurement object 100. The Y-direction slit beam SY passes along an extended optical path defined by the Y-direction mirror 312Y and the Y-direction relay mirror 313Y for projection onto the measurement object 100.

After the projection, the image sensor 411 captures an image of the measurement object 100 including the projected images SXp and SYp of the X-direction slit beam SX and the Y-direction slit beam SY. Then, a depthwise profile of the measurement object 100 such as a step or a gap is obtained, based on the captured image, in other words, step points or break points of the projected slit images SXp and SYp.

Figure 14:
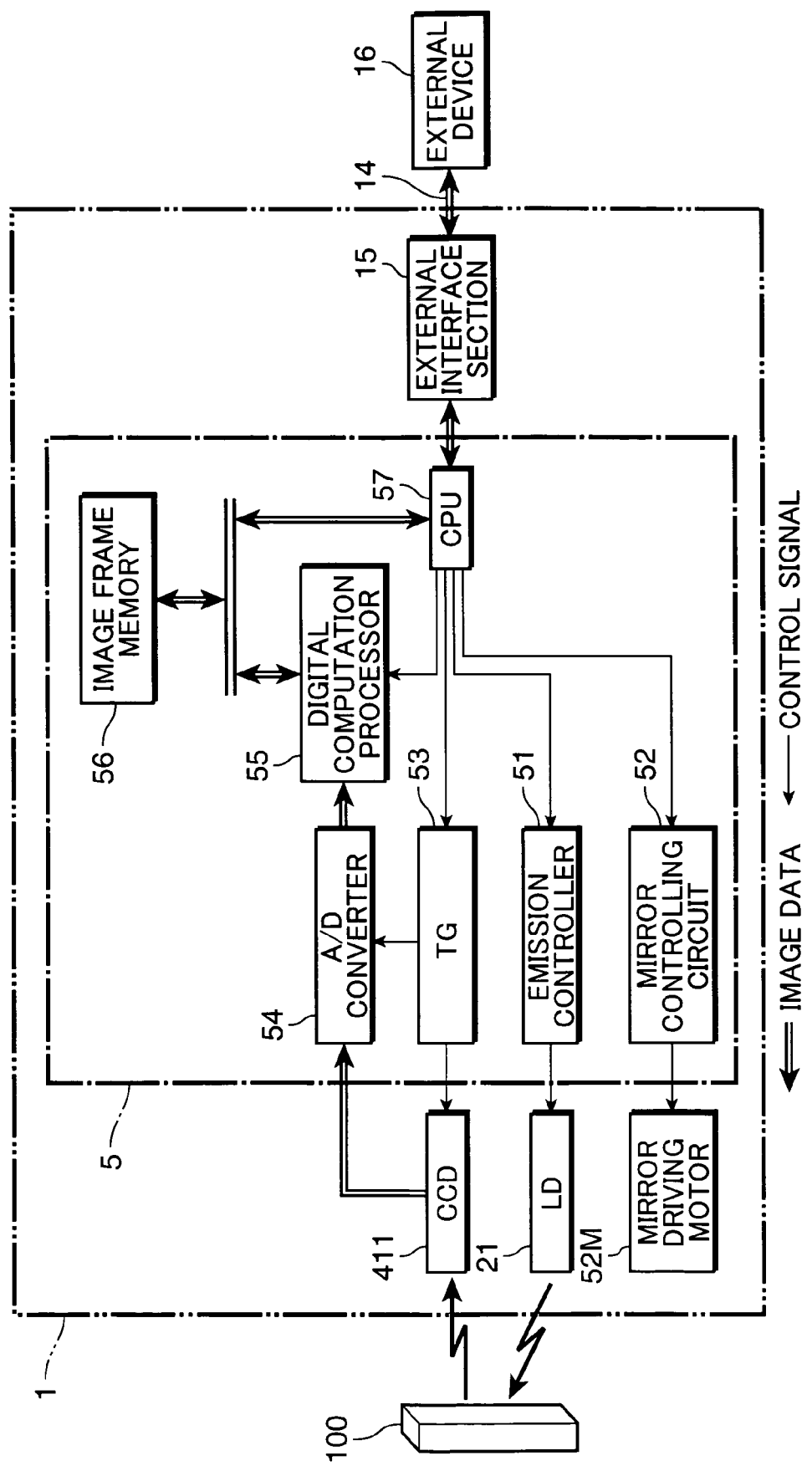
FIG. 14 is a block diagram showing an electrical configuration of the portable three-dimensional shape measuring device.

In the following, an electrical configuration of the portable three-dimensional shape measuring device 1 is described. FIG. 14 is a block diagram showing an electrical configuration of the portable three-dimensional shape measuring device 1. The portable three-dimensional shape measuring device 1 includes a mirror driving motor 52M and an external interface section 15, in addition to the laser light source 21, the image sensor 411, the controller 5, and the aforementioned other constituent elements.

The mirror driving motor 52M is a motor for pivotally rotating the X-direction mirror 312X and the Y-direction mirror 312Y. The mirror driving motor 52M is used to adjust the positions of the projected slit images SXp and SYp or scan the projected slit images SXp and SYp within the respective viewing areas.

The external interface section 15 is an interface for communicatively connecting the portable three-dimensional shape measuring device 1 with an external device 16 such as a personal computer via the USB terminal 14.

The controller 5 includes an emission controller 51, a mirror controlling circuit 52, a timing generator (TG) 53, an A/D converter 54, a digital computation processor 55, an image frame memory 56, and a CPU 57.

The emission controller 51 controls an emission operation of the laser light source 21, and includes a laser driving circuit for oscillating a laser beam. The mirror controlling circuit 52 is a circuit for controlling a driving status of the mirror driving motor 52M.

The timing generator 53 generates a predetermined timing pulse e.g. a vertical transfer pulse, a horizontal transfer pulse, or a charge sweep pulse, based on a reference clock issued from the CPU 57 to output the timing pulse to the image sensor 411 for controlling an imaging operation of the image sensor 411. The timing generator 53 also outputs a predetermined timing pulse to the A/D converter 54 so that the A/D converter 54 performs an analog-to-digital conversion operation.

The A/D converter 54 converts analog image signals of R, G, and B to be outputted from the image sensor 411 into digital image signals of plural bits e.g. 12 bits, based on a timing pulse outputted from the timing generator 53. The A/D converter 54 includes a CDS (correlation double sampling) circuit, an AGC (auto gain control) circuit, and a clamp circuit.

The digital computation processor 55 has an FPGA (field programmable gate array) to generate an image file by applying a predetermined signal processing to image data outputted from the A/D converter 54. The digital computation processor 55 includes a black level correcting circuit, a white balance controlling circuit, and a gamma correcting circuit. The image frame memory 56 has an RAM (random access memory), and stores frame image data captured by the image sensor 411. The image data outputted to the digital computation processor 55 is temporarily written in the image frame memory 56 in synchronism with a readout operation of the image sensor 411. Thereafter, the digital computation processor 55 access the image data written in the image frame memory 56 to cause the circuit blocks in the digital computation processor 55 to perform the respective operations.

The digital computation processor 55 may have a function of performing a computation to measure the three-dimensional shape of the measurement object 100, which will be described later referring to FIG. 15. The portable three-dimensional shape measuring device 1 may include or exclude the computation function. The image data written in the image frame memory 56 may be downloaded to the external device 16 via the external interface section 15 so that the external device 16 may perform a computation to measure the three-dimensional shape of the measurement object 100.

The CPU 57 generates control signals for controlling operations of the emission controller 51, the mirror controlling circuit 52, the timing generator 53, and the digital computation processor 55 in accordance with an operation signal supplied from an unillustrated operating section.

Figure 15:
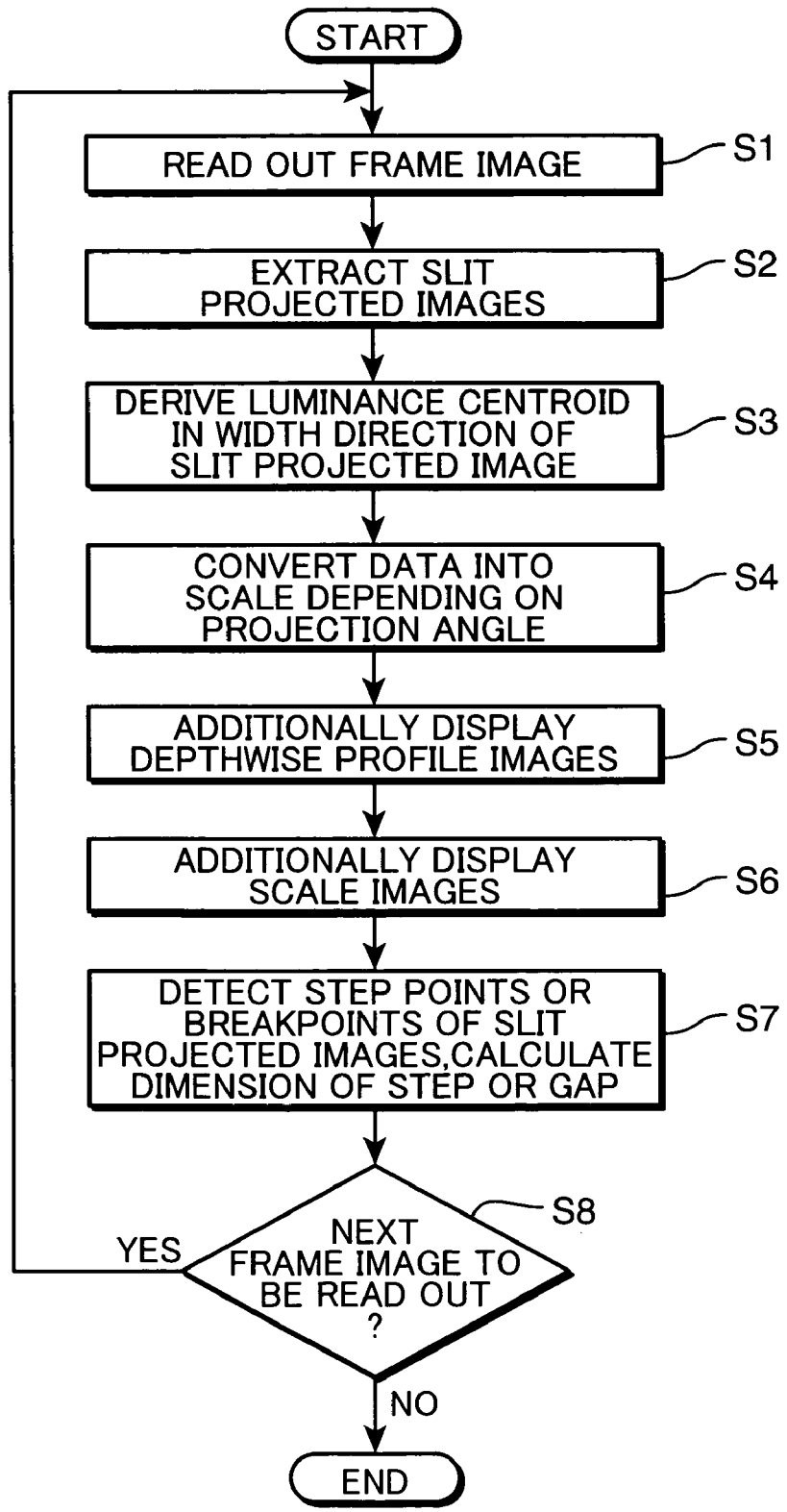
FIG. 15 is a flowchart showing an example of a computation processing for measuring a three-dimensional shape of a measurement object.
Figure 16:
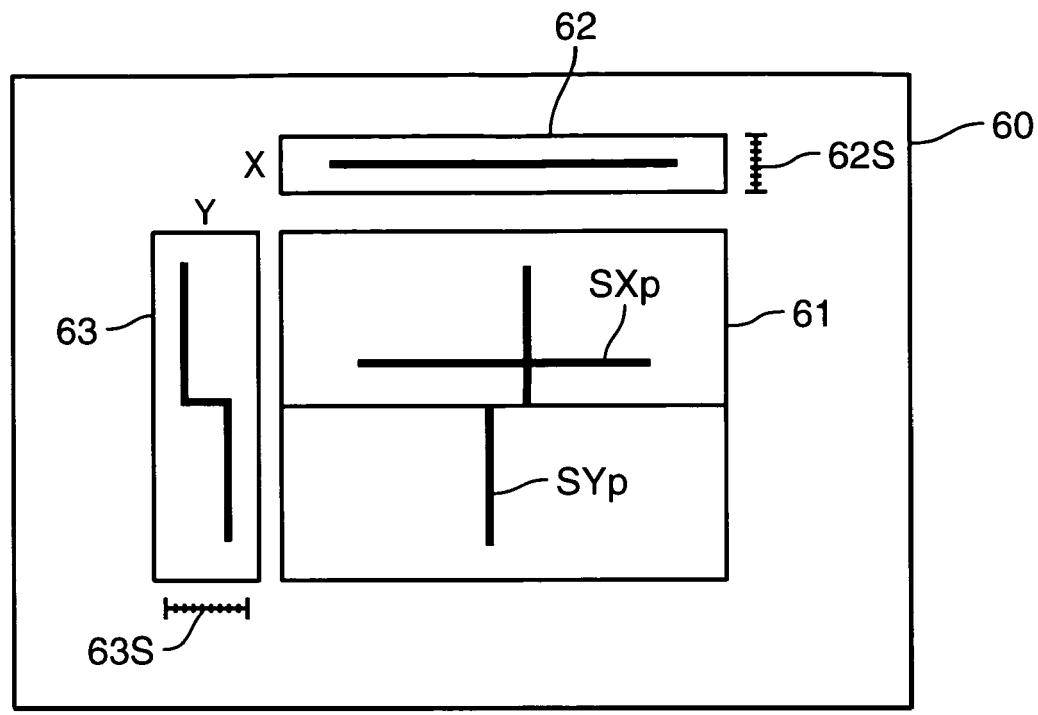
FIG. 16 is a plan view showing an example of a display screen to be displayed on a display device.

An example of a computation to be executed by the digital computation processor 55 or the external device 16 to measure the three-dimensional shape of the measurement object 100 is described referring to a flowchart of FIG. 15. First, the digital computation processor 55 or a computation processor in the external device 16 reads out frame image data for image analysis to measure the three dimensional shape of the measurement object 100 (Step S1). FIG. 16 shows an example of a display screen to be displayed on a display device 60 equipped in the external device 16, specifically, showing a state that a readout frame image 61 is displayed in the middle of the display screen.

After the image readout operation, data corresponding to the projected slit images SXp and SYp included in the frame image 61 are extracted (Step S2). Specifically, a filter processing is performed to extract an edge in images corresponding to the projected slit images SXp and SYp. Examples of a filter for edge extraction are a differentiation filter, a Sobel filter, a gradient filter, and a Laplacian filter.

Figure 17:
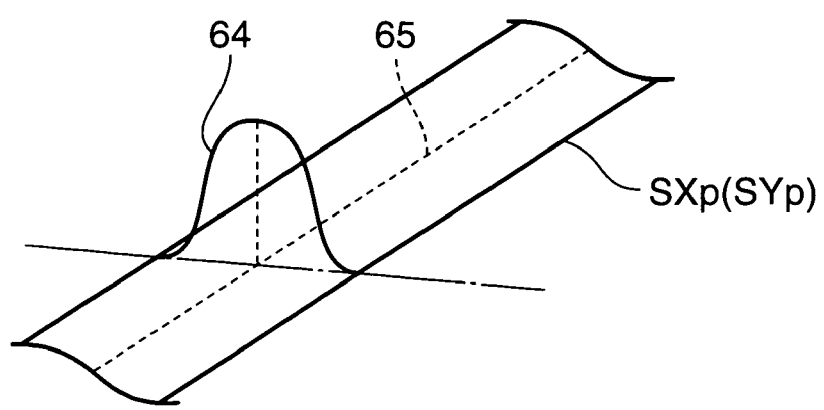
FIG. 17 is a diagram for describing a centroid slit.

After the edge extraction, a targeted line as a centroid slit is defined in the projected slit images SXp and SYp (Step S3). A projected slit image has a certain width even in a focus state. Accordingly, it is necessary to specify positions of the projected slit images SXp and SYp corresponding to step points or break points. As shown in FIG. 17, the embodiment adopts a technique of obtaining a luminance distribution 64 in the width direction of the projected slit image SXp (SYp) to calculate a centroid line 65 as the centroid slit to define the targeted line.

After the centroid slit is defined, step points or break points are obtained with respect to the centroid slit. For instance, the projected slit image SYp in the frame image 61 includes step points. The distance between the step points in the frame image 61 is defined as a depthwise profile of the measurement object, and the depthwise profile is converted into a scale depending on the projection angle "α" (see FIG. 6) of the slit beam (Step S4). Thereby, a section of the measurement object on the line where the projected slit image SXp (SYp) as the centroid slit is formed is determined.

It is possible to display various images of the measurement object based on the depthwise profile. For instance, as shown in FIG. 16, depthwise profile images 62 and 63 of projected lines in X-direction and Y-direction are displayed at lateral positions of the frame image 61 on the display 60 (Step S5). Then, scale images 62S and 63S are additionally displayed to allow the user to read the depth of the step or the gap (Step S6).

After the image display, the dimension of the step or the gap of a specific area including the centroid slit is calculated in response to a user's command (Step S7). For instance, in response to designation of two step points, operations of calculating a distance between the two step points, accepting a designation on a specific area to be measured, and obtaining a highest point in the designated area are performed. Thereafter, it is confirmed whether a three-dimensional shape analysis is to be performed with respect to a next frame image (Step S8). If it is confirmed that the analysis is to be continued (YES in Step S8), the routine returns to Step S1 to repeat the aforementioned operations. If, on the other hand, it is judged that the analysis is terminated (NO in Step S8), the routine is ended.

Second Embodiment of Measurement Head

Figure 18:
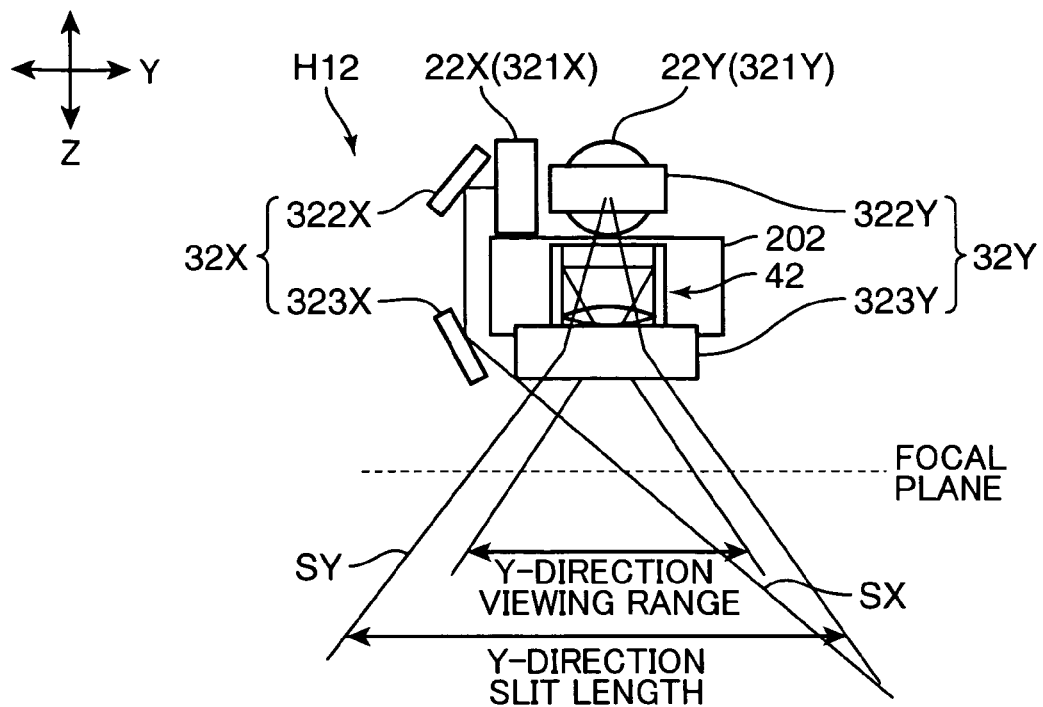
FIG. 18 is a front view of a measurement head as a second embodiment of the invention.
Figure 19:
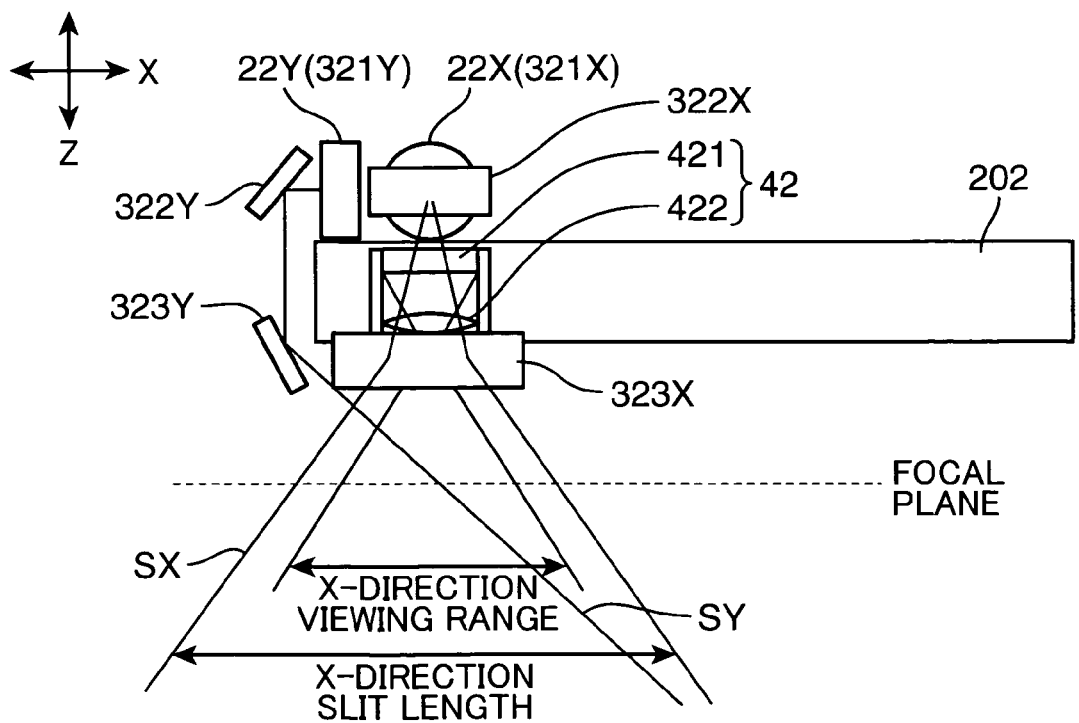
FIG. 19 is a side view of the measurement head in the second embodiment.

In this section, a second embodiment of the measurement head is described. In the first embodiment, an optical path from a single light source is divided by the half prism 311. In the second embodiment, plural light sources are arranged depending on the number of (in this embodiment, two) slit beams to be projected. FIG. 18 is a front view of a measurement head H2 in accordance with the second embodiment, viewed from X-direction in FIG. 1. FIG. 19 is a side view of the measurement head H2, viewed from Y-direction in FIG. 1. The measurement head H2 includes a base block 202, an X-direction laser light source 22X as a first light source, a Y-direction laser light source 22Y as a second light source, an X-direction slit beam projecting optical system 32X as a first slit beam projecting optical system, a Y-direction slit beam projecting optical system 32Y as a second slit beam projecting optical system, and an imaging unit 42.

Figure 20:
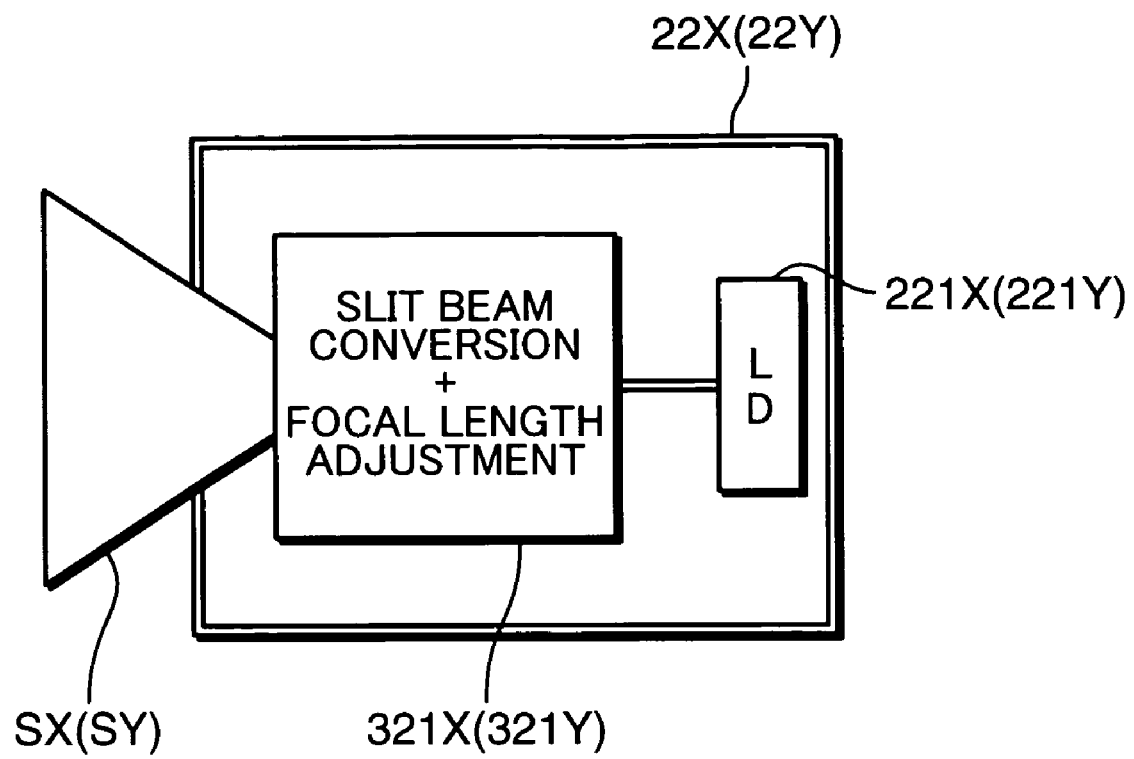
FIG. 20 is a schematic diagram briefly showing an internal arrangement of a laser light source.

The X-direction laser light source 22X and the Y-direction laser light source 22Y are each a micro laser light source equipped with a semiconductor light emitter i.e. a laser diode, as a laser generator. The light sources 22X and 22Y are mounted on the back side of the base block 202 i.e. the imaging unit 42 in such a manner that laser beams emitted from the light sources 22X and 22Y are angularly displaced from each other by 90 degrees. As shown in FIG. 20, in actual arrangement, the X-direction laser light source 22X (Y-direction laser light source 22Y) has a housing structure, and internally includes a laser diode 221X (221Y), and a conversion optical system 321X (321Y) constituting a part of the X-direction slit beam projecting optical system 32X (Y-direction slit beam projecting optical system 32Y).

The conversion optical system 321X (321Y) is disposed at a light exit end of the laser diode 221X (221Y), and has a function of converting a laser beam emitted from the laser diode 221X (221Y) into a slit beam of a fan-like shape. The conversion optical system 321X (321Y) includes an optical component for performing a focus adjustment of the light projecting optical system. In this arrangement, the X-direction laser light source 22X and the Y-direction laser light source 22Y output an X-direction slit beam SX as a first slit beam and a Y-direction slit beam SY as a second slit beam perpendicularly intersecting with each other.

Since the arrangement of the second embodiment is substantially the same as that of the first embodiment except for the above arrangement, the second embodiment is briefly described. The imaging unit 42 includes an image sensor 421 and a light receiving optical system 422. The image sensor 421 is mounted on the base block 202 in such a manner that the light receiving plane of the image sensor 421 is disposed in parallel with a measurement object.

The X-direction slit beam projecting optical system 32X includes the conversion optical system 321X, an X-direction mirror 322X as a first reflector, and an X-direction relay mirror 323X. The X-direction mirror 322X is arranged near the back side of the imaging unit 42, and accordingly, is arranged farther from the light receiving plane of the image sensor 421, viewed from the measurement object. The X-direction relay mirror 323X is arranged near the front side of the imaging unit 42.

The Y-direction slit beam projecting optical system 32Y includes the conversion optical system 321Y, a Y-direction mirror 322Y as a second reflector, and a Y-direction relay mirror 323Y. Similarly to the X-direction mirror 322X, the Y-direction mirror 322Y is arranged farther from the light receiving plane of the image sensor 421, and the Y-direction relay mirror 323Y is arranged near the front side of the imaging unit 42.

A slit beam SX emitted from the X-direction laser light source 22X is reflected on the X-direction mirror 322X, reflected on the X-direction relay mirror 323X, and projected onto the viewing area of the image sensor 421. Likewise, a slit beam SY emitted from the Y-direction laser light source 22Y is reflected on the Y-direction mirror 322Y, reflected on the Y-direction relay mirror 323Y, and projected onto the viewing area of the image sensor 421. As a result of the projection, projected slit images perpendicularly intersecting with each other are formed on the measurement object in a similar manner as the first embodiment.

The X-direction slit beam projecting optical system 32X and the Y-direction slit beam projecting optical system 32Y each has an extended optical path for guiding the slit beam toward the measurement object while passing the slit beam around the back side and a lateral side of the imaging unit 42. With the provision of the extended optical paths, the X-direction slit beam SX and the Y-direction slit beam SY are projected onto the measurement object with sufficiently long slit lengths, while securing miniaturization of the measurement head H2.

Third Embodiment of Measurement Head

Figure 21:
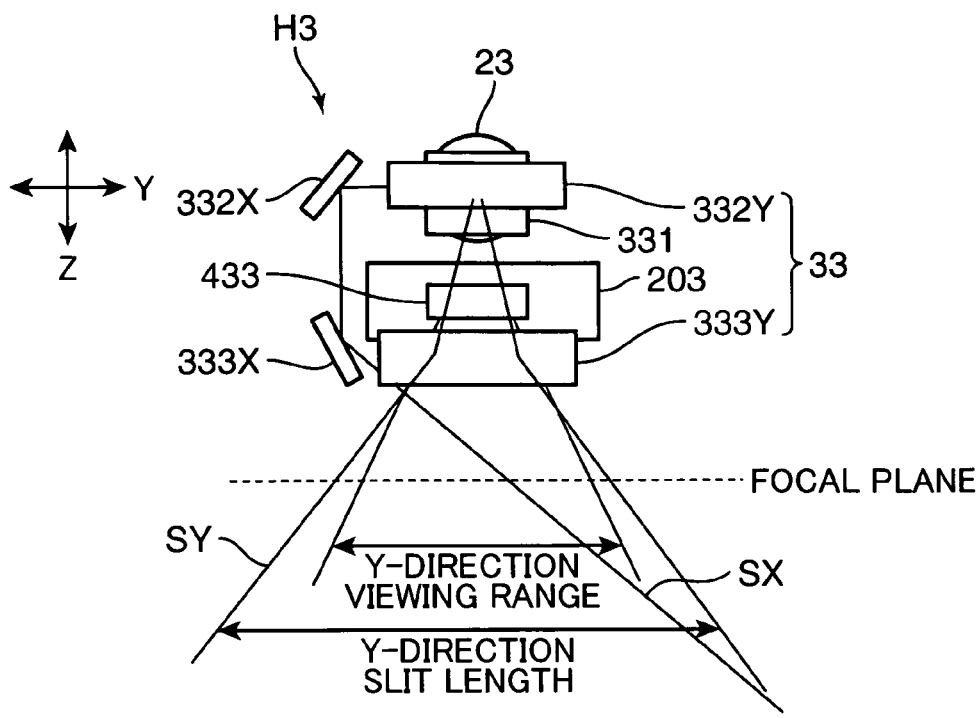
FIG. 21 is a front view of a measurement head as a third embodiment of the invention.
Figure 22:
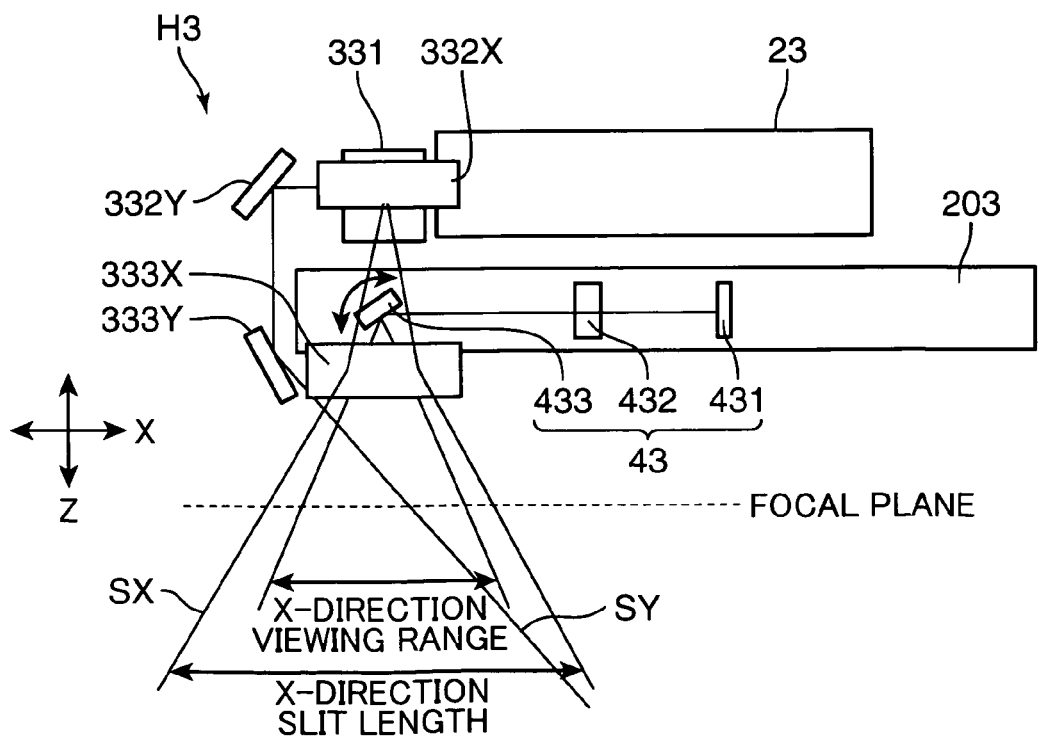
FIG. 22 is a side view of the measurement head in the third embodiment.

In this section, a third embodiment of the invention is described. Whereas in the first embodiment, the optical path of the light receiving optical system is straight, in the third embodiment, an optical path of a light receiving optical system is bent by 90 degrees. FIG. 21 is a front view of a measurement head H3 in accordance with the third embodiment, viewed from X-direction in FIG. 1. FIG. 22 is a side view of the measurement head H3, viewed in Y-direction in FIG. 1. The measurement head H3 includes a base block 203, a laser light source 23, a slit beam projecting optical system 33, and an imaging unit 43. Since the third embodiment is different from the first embodiment merely in the imaging unit, the arrangement of the elements other than the imaging unit 43 in the third embodiment is briefly described.

The imaging unit 43 includes a one-dimensional image sensor 431, a light receiving lens 432, and a galvanometric mirror 433 as a driving mirror. The one-dimensional image sensor 431 is e.g. a CCD line sensor, in which pixels are arrayed in one direction. The galvanometric mirror 433 is a driving mirror for scanning a viewing area to sequentially guide slit reflecting light toward the one-dimensional image sensor 431. The galvanometric mirror 433 is mounted on the base block 203 at a position in parallel alignment with the measurement object. Similarly to the first and the second embodiments, in the third embodiment, light reflected on the measurement object including a slit beam is received in a direction in parallel alignment with the measurement object.

The slit beam projecting optical system 33 includes a half prism 331 for splitting a single slit beam into an X-direction slit beam SX and a Y-direction slit beam SY; an X-direction mirror 332X and an X-direction relay mirror 333X for irradiating the X-direction slit beam SX; and a Y-direction mirror 332Y and a Y-direction relay mirror 333Y for irradiating the Y-direction slit beam SY. The X-direction slit beam SX and the Y-direction slit beam SY are projected onto a viewing area of the one-dimensional image sensor 431 i.e. a scanning area of the galvanometric mirror 433 via extended optical paths respectively defined by the X-direction mirror 332X and the X-direction relay mirror 333X, and the Y-direction mirror 332Y and the Y-direction relay mirror 333Y.

The slit beam reflected on the viewing area is bent by an angle approximate to 90 degrees by the galvanometric mirror 433, and then is propagated toward the light receiving plane of the one-dimensional image sensor 431 through the light receiving lens 432 for image formation. In accordance with a pivotal rotation of the galvanometric mirror 433, the slit reflecting light is sequentially guided to the one-dimensional image sensor 431 from one lateral end of the viewing area toward the other lateral end thereof. Thus, a two-dimensional image corresponding to the viewing area i.e. the measurement object including the projected images of the X-direction slit beam SX and the Y-direction slit beam SY is acquired by synthesizing the one-dimensional images formed on the light receiving plane of the one-dimensional image sensor 431.

The measurement head H3 having the above arrangement is advantageous in reducing the thickness of the measuring device in Z-direction, because the receiving optical axis is bent substantially at 90 degrees by the galvanometric mirror 433.

Fourth Embodiment of Measurement Head

Figure 23:
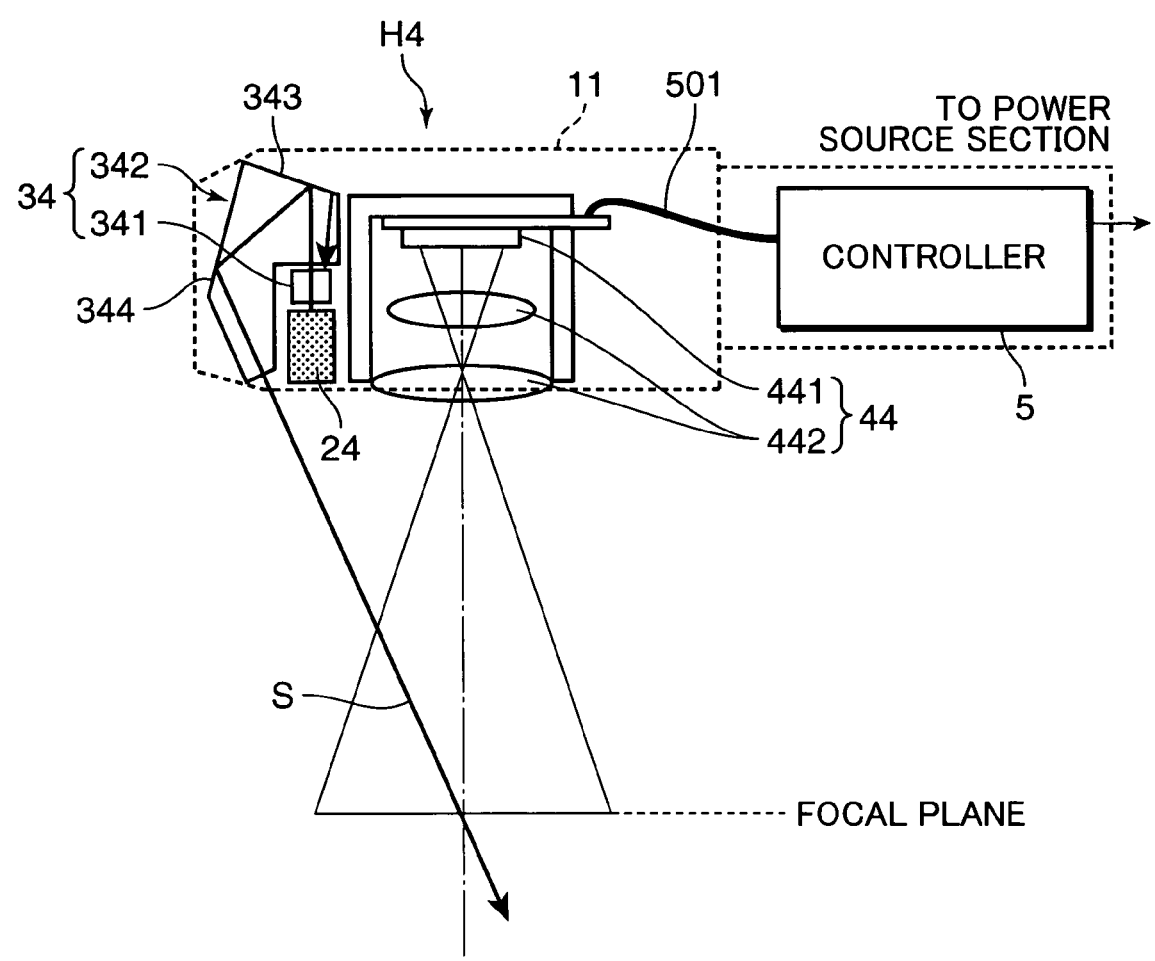
FIG. 23 is a side view of a measurement head as a fourth embodiment of the invention.

In this section, a fourth embodiment of the invention is described. In the first through the third embodiments, the light source is or the light sources are disposed on the back side of the imaging unit. In the fourth embodiment, a light source is disposed on a lateral side of an imaging unit. FIG. 23 is a side view of a measurement head H4 in accordance with the fourth embodiment. The measurement head H4 includes an LD (laser diode) 24, a slit beam projecting optical system 34, and an imaging unit 44.

The imaging unit 44 is disposed in parallel with a measurement object in the similar manner as the first and the second embodiments. The imaging unit 44 includes an image sensor 441 e.g. a CCD area sensor, and a light receiving optical system 442. The reference numeral 501 indicates a flexible cable for electrically connecting the image sensor 441 with a controller 5.

The laser diode 24 is disposed on the lateral side of the imaging unit 44 at such a position that a laser beam from the laser diode 24 is emitted in a direction opposite to the measurement object.

The slit beam projecting optical system 34 includes a conversion optical system 341 for converting a laser beam emitted from the laser diode 24 into a slit beam S of a fan-like shape, and a polygonal prism 342 for reflecting the slit beam S for output. The polygonal prism 342 is adapted to form an extended optical path in the fourth embodiment, and is disposed near the lateral side of the imaging unit 44. The polygonal prism 342 includes a first reflecting plane 343, which is disposed near the lateral side of the imaging unit 44 and at a position farther from the light receiving plane of the imaging unit 44, viewed from the measurement object, to reflect the slit beam S; and a second reflecting plane 344 disposed closer to the measurement object than the first reflecting plane 343 to reflect the slit beam S reflected on the first reflecting plane 343. The slit beam S reflected on the second reflecting plane 344 is projected onto the measurement object at a predetermined angle inclined with respect to the receiving optical axis of the light receiving plane of the image sensor 441.

In the above arrangement, both of the laser diode 24 and the slit beam projecting optical system 34 are disposed on the lateral side of the imaging unit 44. This enables to reduce the thickness of the measuring device, as compared with the arrangements in the first through the third embodiments, wherein the light source is or the light sources are disposed on the back side of the imaging unit. Further, the slit beam S is guided toward the measurement object along the extended optical path via the first and the second reflecting planes 343 and 344 of the polygonal prism 342 disposed near the imaging unit 44. This arrangement enables to extend the optical path length. Thus, the arrangement is advantageous in securing a sufficiently long length of the slit beam S without using a lens having a strong optical power. In the fourth embodiment (see FIG. 23), the single slit beam S is projected onto the focal plane. Alternatively, similarly to the first through the third embodiments, multiple slit beams may be projected onto the focal plane. The modification is also applied to the following embodiments.

Description on Other Embodiments of Measurement Head

In this section, measurement heads in accordance with fifth to eleventh embodiments are described referring to FIGS. 24 through 30. In these drawings, X-direction and Z-direction are the same as the corresponding directions in FIG. 1. Measurement heads H5, H6, H7, H8, H9, H10, and H11 shown in FIGS. 24, 25, 26, 27A and 27B, 28, 29, and 30 are common in the point that the measurement head H5, H6, H7, H8, H9, H10, H11 includes an LD (laser diode) 25; a slit beam projecting optical system 35A, 35B, 35C, 35D, 35E, 35F, 35G provided with an extended optical path; and an imaging unit 45. The measurement heads H5 through H11 are also common in that the imaging unit 45 is disposed in parallel with a measurement object, and that the imaging unit 45 includes an image sensor 451 e.g. a CCD area sensor, and a light receiving optical system 452. The measurement heads H5 through H10 shown in FIGS. 24 through 29 are also common in that the slit beam projecting optical systems 35A through 35F each has a conversion optical system 351 for converting a laser beam emitted from the laser diode 25 into a slit beam S of a fan-like shape. A repeated description on the common arrangements in the fifth through the eleventh embodiments is omitted in the following description.

Figure 24:
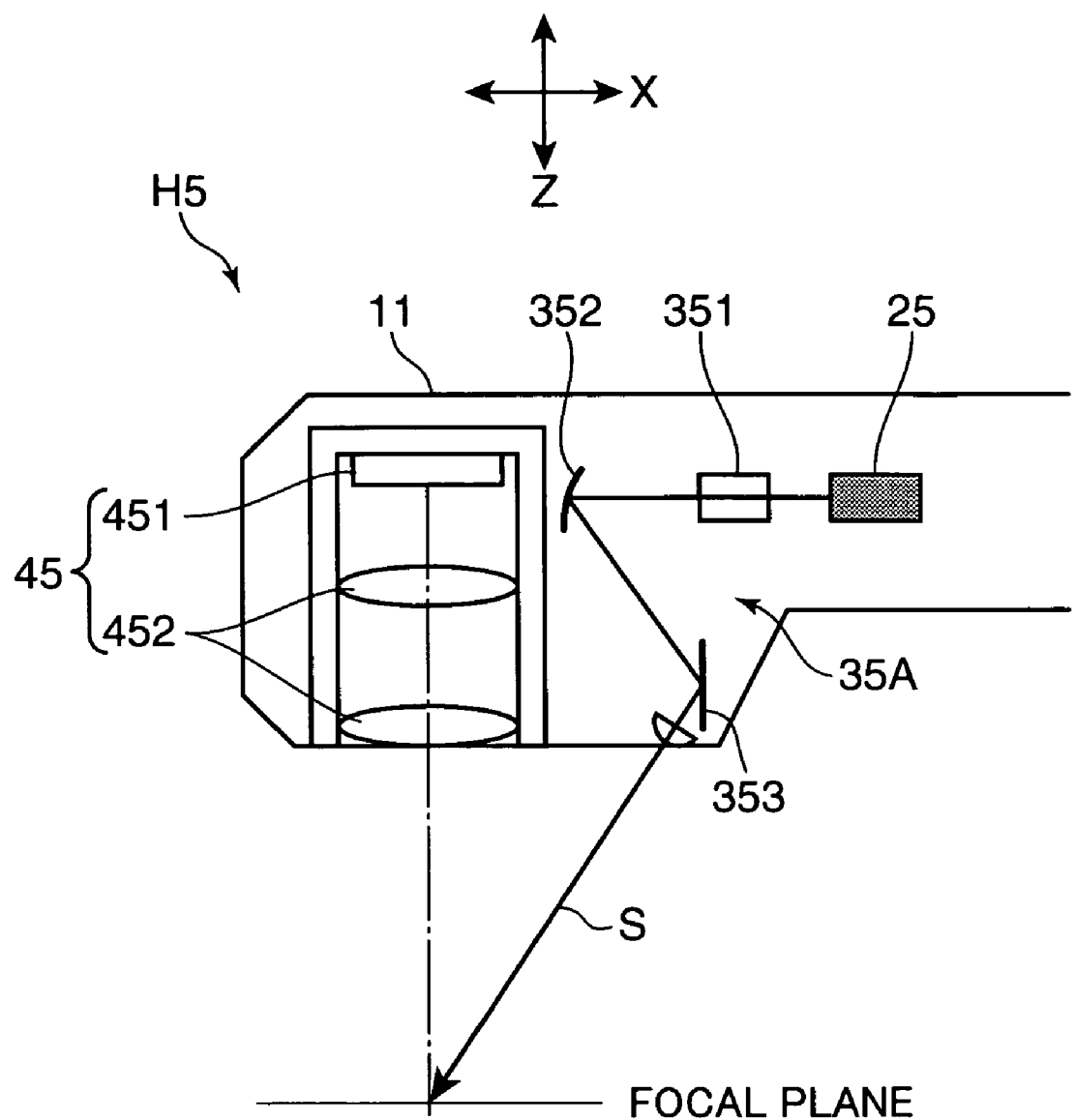
FIG. 24 is a layout diagram of a measurement head in X-Z direction as a fifth embodiment of the invention.

FIG. 24 is a layout diagram of the measurement head H5 as the fifth embodiment in X-Z direction. The slit beam projecting optical system 35A of the measurement head H5 includes a first mirror 352 disposed at a position close to the upper part of the imaging unit 45; and a second mirror 353 which is disposed as opposed to the first mirror 352 and at a position corresponding to the lower part of the imaging unit 45 and away from the imaging unit 45 by a predetermined distance i.e. at a position capable of securing a projection angle. The laser diode 25 and the conversion optical system 351 are arranged in a grip portion G at a position substantially the same height as the first mirror 352.

In use of the measurement head H5, a slit beam S is first reflected on the first mirror 352, and then irradiated in a direction away from the vicinity of the imaging unit 45 i.e. in a direction toward the second mirror 353 in a planar direction (in this embodiment, X-direction) of the light receiving plane of the image sensor 451. Thereafter, the slit beam S is reflected on the second mirror 353, and projected onto the focal plane i.e. the measurement object. Thus, the slit beam S is projected onto the measurement object with a sufficiently long slit length by passing along an extended optical path via the first mirror 352 and the second mirror 353.

Figure 25:
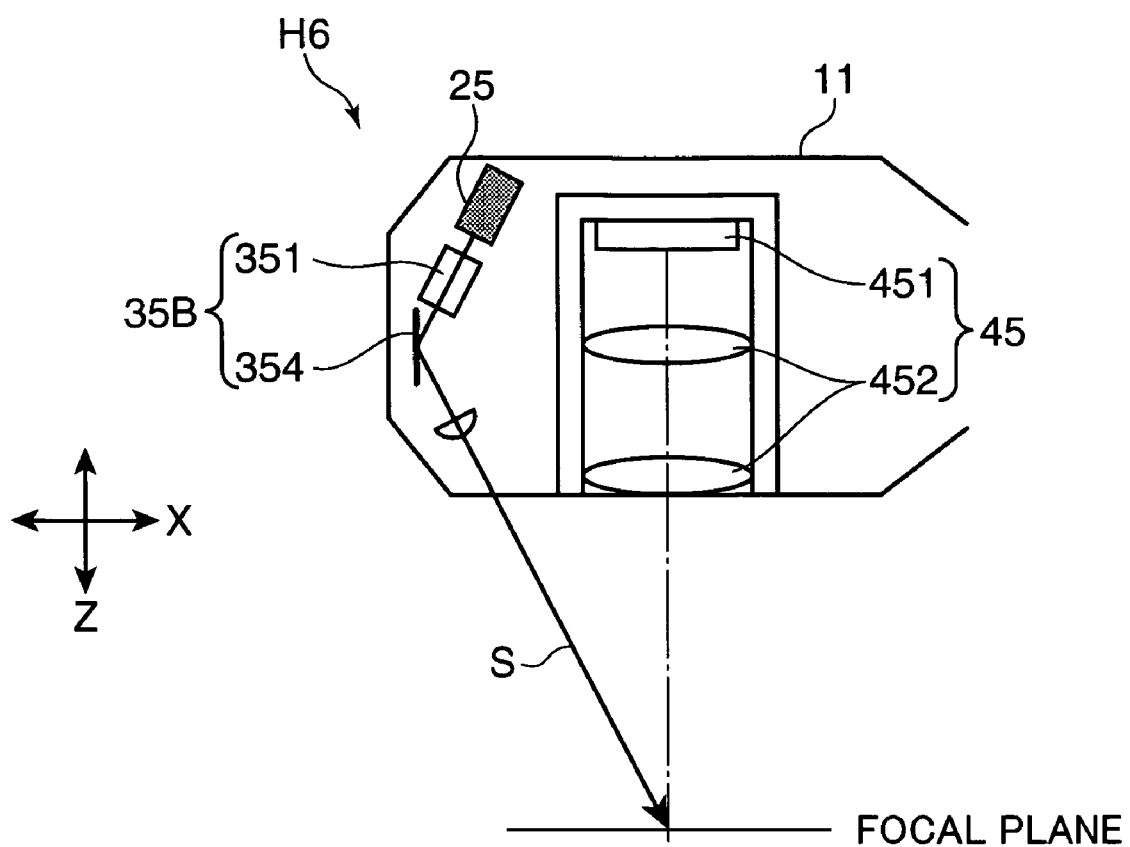
FIG. 25 is a layout diagram of a measurement head in X-Z direction as a sixth embodiment of the invention.

FIG. 25 is a layout diagram of the measurement head H6 as the sixth embodiment in X-Z direction. The slit beam projecting optical system 35B of the measurement head H6 includes a mirror 354 disposed at a vertically middle position of the imaging unit 45 and at a position away from the imaging unit 45 by a predetermined distance in X-direction. The laser diode 25 is arranged near the upper part of the imaging unit 45 in such a direction that a slit beam S is irradiated toward the mirror 354.

In use of the measurement head H6, the slit beam S is first irradiated from the laser diode 25 in X-direction from a vicinity of the upper part of the imaging unit 45 in a direction away from the imaging unit 45. Thereafter, the slit beam S is reflected on the mirror 354, and projected onto the focal plane i.e. the measurement object. Thus, the slit beam S is projected onto the measurement object with a sufficiently long slit length by passing along an extended optical path via the mirror 354.

Figure 26:
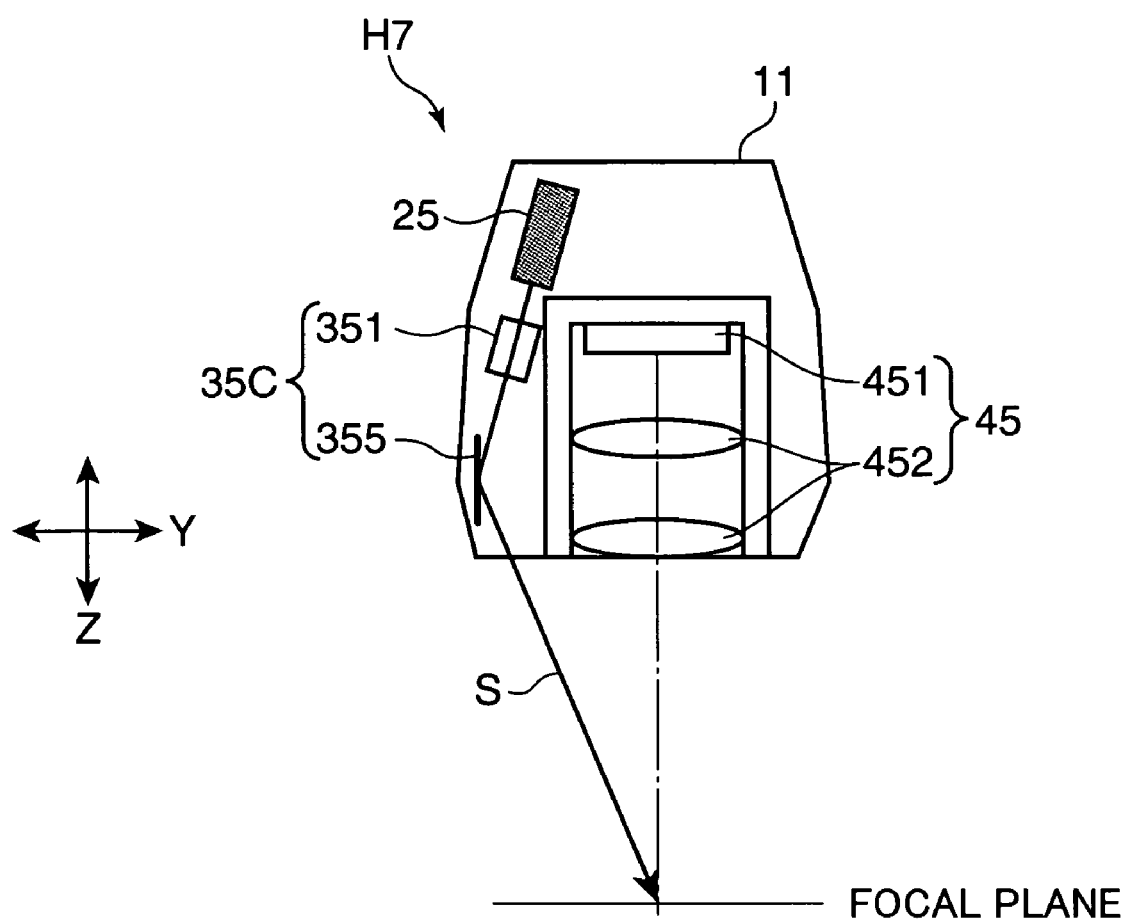
FIG. 26 is a layout diagram of a measurement head in Y-Z direction as a seventh embodiment of the invention.

FIG. 26 is a layout diagram of the measurement head H7 as the seventh embodiment in Y-Z direction. The slit beam projecting optical system 35C of the measurement head H7 includes a mirror 355 disposed at a position close to the lower part of the imaging unit 45 and away from the imaging unit 45 by a predetermined distance in Y-direction. The laser diode 25 is arranged close to the back side of the imaging unit 45 to reduce the thickness of the measuring device in Y-direction, and at such a position that a slit beam S is irradiated toward the mirror 355.

In use of the measurement head H7, the slit beam S is first irradiated from the laser diode 25 in Y-direction from a vicinity of the upper part of the imaging unit 45 in a direction away from the imaging unit 45. Thereafter, the slit beam S is reflected on the mirror 355, and projected onto the focal plane i.e. the measurement object. Thus, the slit beam S is projected onto the measurement object with a sufficiently long slit length by passing along an extended optical path via the mirror 355.

Figure 27A:
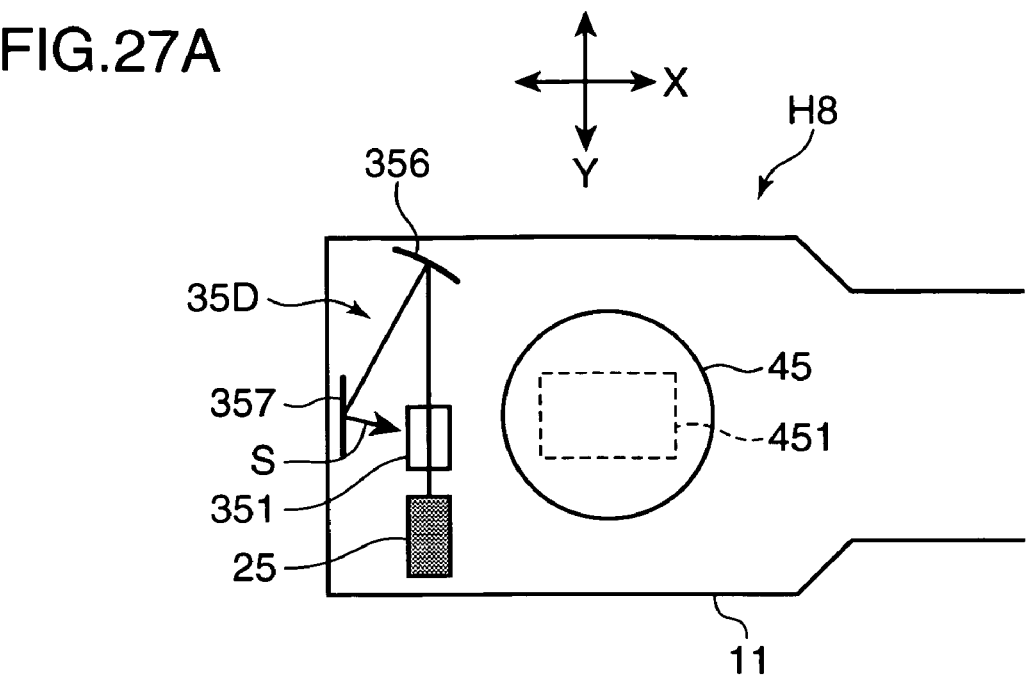
FIG. 27A is a layout diagram of a measurement head in X-Y direction as an eighth embodiment of the invention.
Figure 27B:
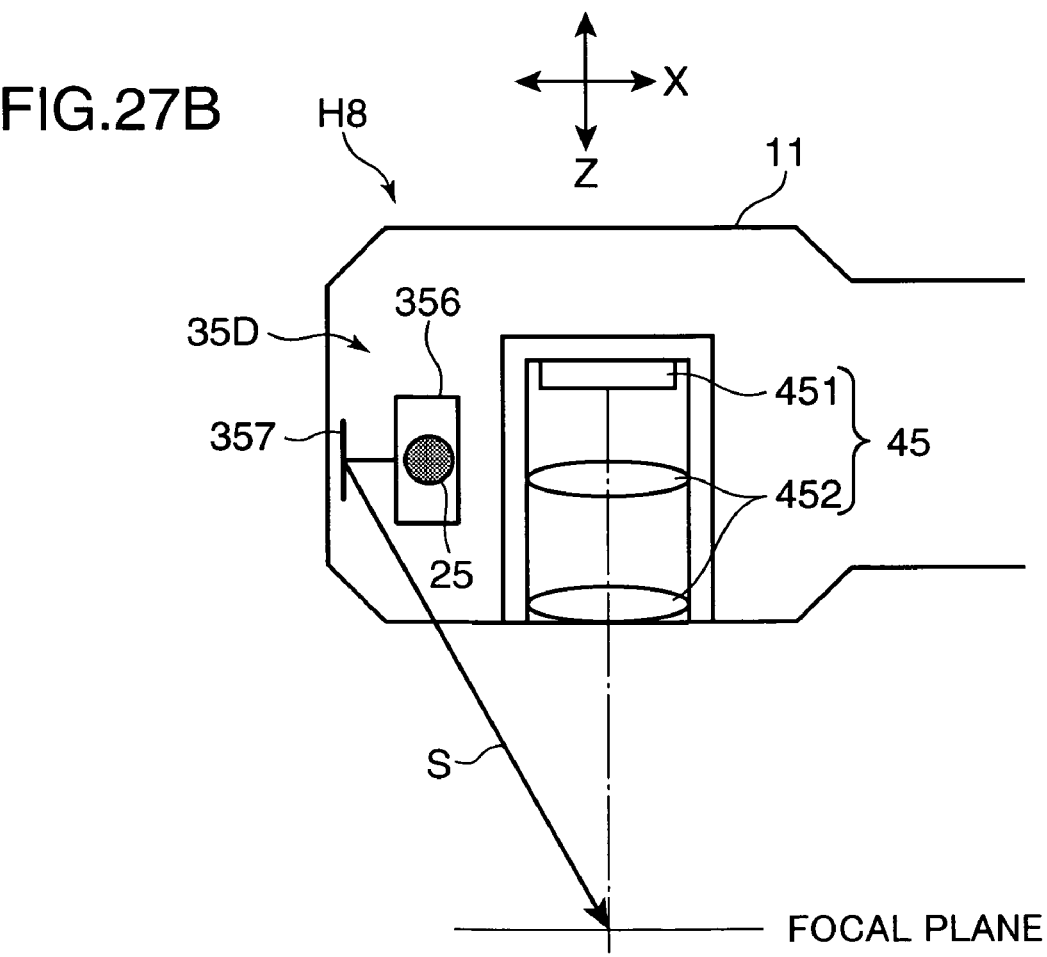
FIG. 27B is a layout diagram of the measurement head in X-Z direction in the eighth embodiment.

FIGS. 27A and 27B are layout diagrams of the measurement head H8 as the eighth embodiment. FIG. 27A is a layout diagram in X-Y direction, and FIG. 27B is a layout diagram in X-Z direction. The slit beam projecting optical system 35D of the measurement head H8 includes a first mirror 356 disposed at a vertically middle position of the imaging unit 45, and close to a Y-direction side wall of a head housing portion 11; and a second mirror 357 disposed at a vertically middle position of the imaging unit 45 and away from the imaging unit 45 by a predetermined distance in X-direction. The laser diode 25 is arranged close to the other Y-direction side wall of the head housing portion 11 as opposed to the first mirror 356.

In use of the measurement head H8, a slit beam S is irradiated in Y-direction from a vicinity of the middle part of the imaging unit 45, and reflected on the first mirror 356 for propagation toward the second mirror 357. Thereby, the slit beam S is temporarily irradiated in X-direction i.e. in a direction away from the imaging unit 45. Thereafter, the slit beam S is reflected on the second mirror 357, and projected onto the focal plane i.e. the measurement object. Thus, the slit beam S is projected onto the measurement object with a sufficiently long slit length by passing along an extended optical path via the first mirror 356 and the second mirror 357.

Figure 28:
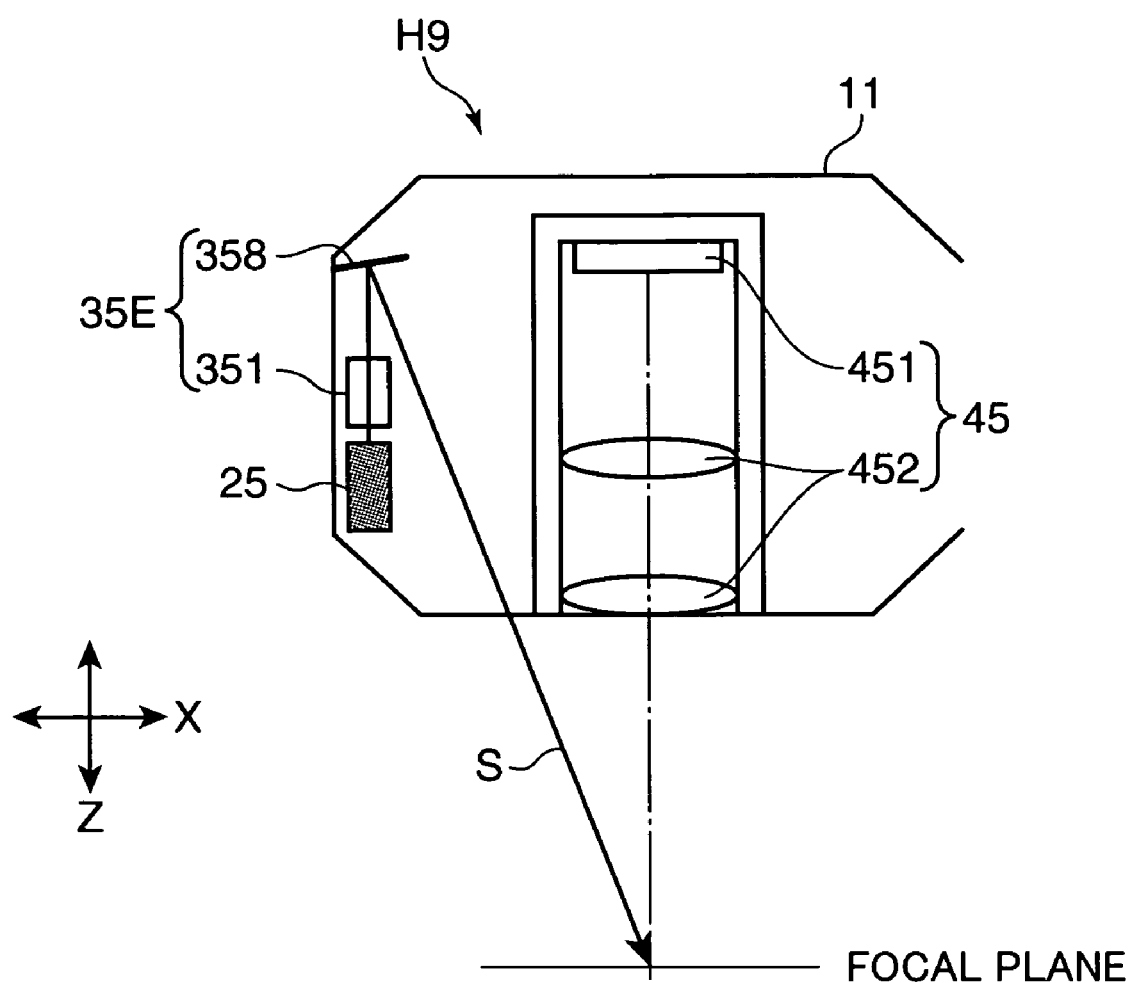
FIG. 28 is a layout diagram of a measurement head in X-Z direction as a ninth embodiment of the invention.

FIG. 28 is a layout diagram of the measurement head H9 as the ninth embodiment in X-Z direction. The slit beam projecting optical system 35E of the measurement head H9 includes a mirror 358 disposed at a position corresponding to the upper part of the imaging unit 45, and away from the imaging unit 45 by a predetermined distance in X-direction. The laser diode 25 is arranged at a position corresponding to the lower part of the imaging unit 45 in such a direction that a slit beam S is irradiated toward the mirror 358.

In use of the measurement head H9, the slit beam S is first irradiated from the laser diode 25 in Z-direction opposite to the focal plane. Thereafter, the slit beam S is reflected on the mirror 358, and projected onto the focal plane i.e. the measurement object. Thus, the slit beam S is projected onto the measurement object with a sufficiently long slit length by passing along an extended optical path via the mirror 358.

Figure 29:
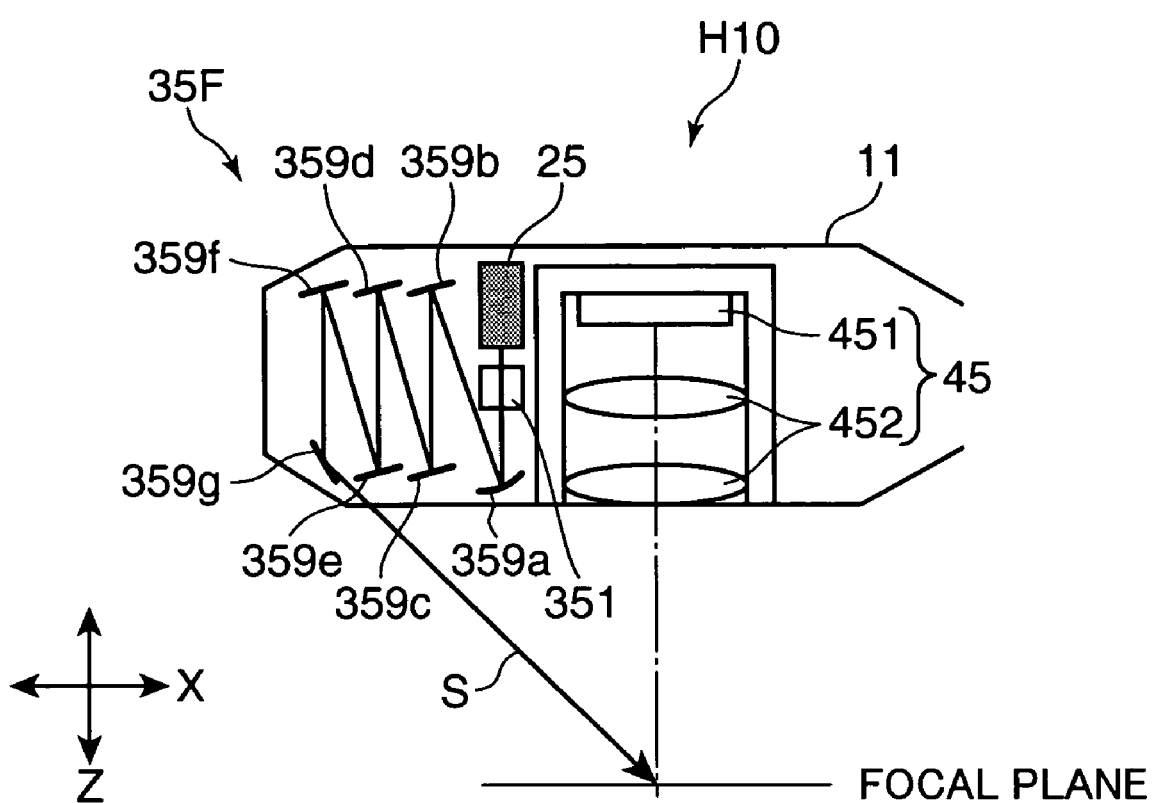
FIG. 29 is a layout diagram of a measurement head in X-Z direction as a tenth embodiment of the invention.

FIG. 29 is a layout diagram of the measurement head H10 as the tenth embodiment in X-Z direction. The slit beam projecting optical system 35F of the measurement head H10 includes a first mirror 359a, a second mirror 359b, a third mirror 359c, a fourth mirror 359d, a fifth mirror 359e, a sixth mirror 359f, and a seventh mirror 359g. The first mirror 359a, the third mirror 359c, the fifth mirror 359e, and the seventh mirror 359g are arranged at positions corresponding to the lower part of the imaging unit 45; and the second mirror 359b, the fourth mirror 359d, and the sixth mirror 359f are arranged at positions corresponding to the upper part of the imaging unit 45 in such a manner that the first through the seventh mirrors 359a through 359g are sequentially and gradually away from the imaging unit 45 in X-direction. The laser diode 25 is arranged along an outer wall of the imaging unit 45 to reduce the thickness of the measuring device in Z-direction, and in such a direction that a slit beam S is irradiated toward the first mirror 359a.

In use of the measurement head H10, the slit beam S is first reflected on the first mirror 359a, and then sequentially reflected on the second through the sixth mirrors 359b through 359f in this order so that the slit beam S is guided away from the imaging unit 45 in X-direction. Finally, the slit beam S is reflected on the seventh mirror 359g, and projected onto the focal plane i.e. the measurement object. Thus, the slit beam S is projected onto the measurement object with a sufficiently long slit length by passing along an extended optical path via the first through the seventh mirrors 359a through 359g.

Figure 30:
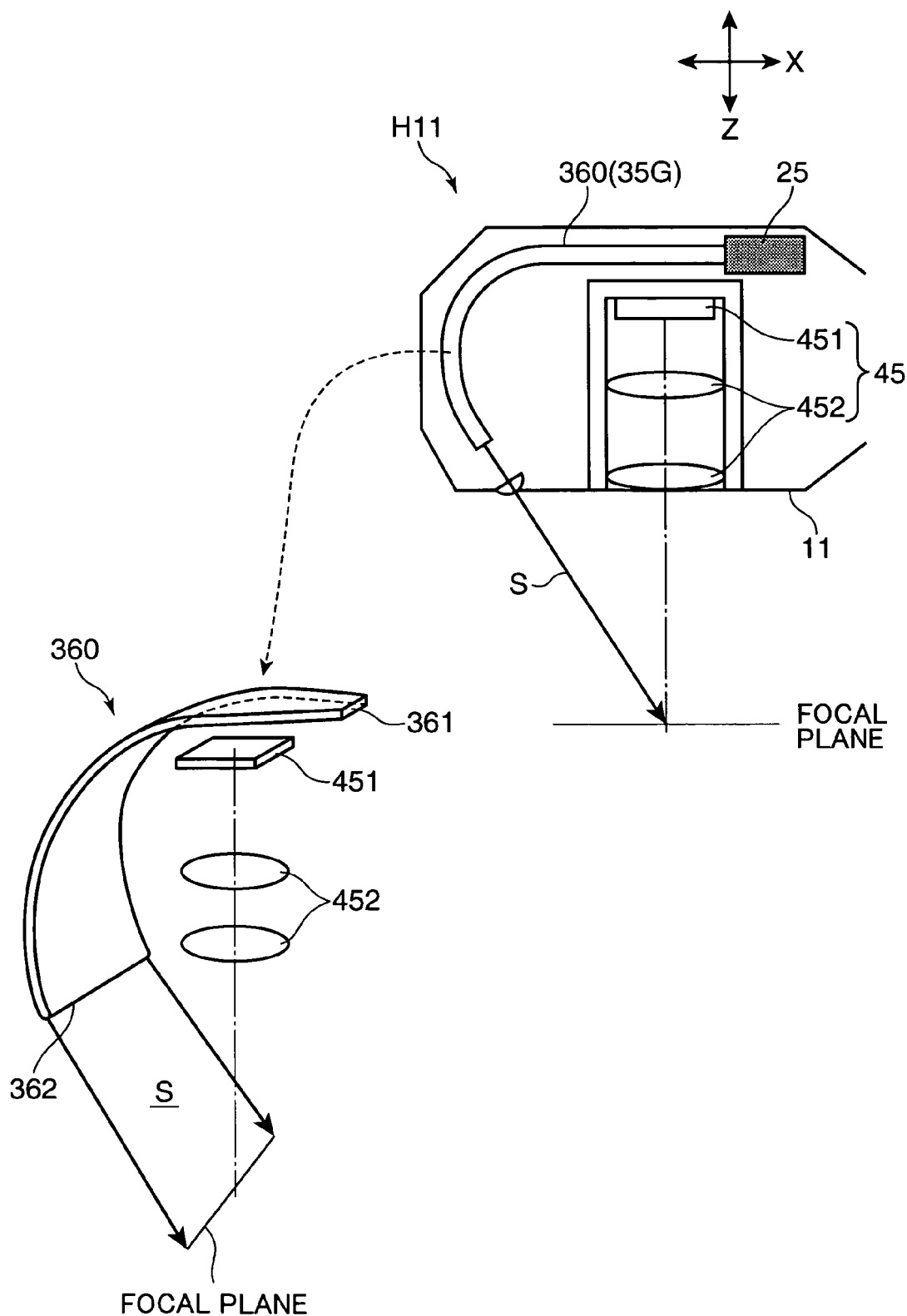
FIG. 30 is a layout diagram of a measurement head in X-Z direction as an eleventh embodiment of the invention.

FIG. 30 is a layout diagram of the measurement head H11 as the eleventh embodiment in X-Z direction. The slit beam projecting optical system 35G of the measurement head H11 includes a light guiding member 360 for guiding a slit beam S. The light guiding member 360 is a thin light guider having an incident end 361 of a narrow width, an exit end 362 of a large width, and a tapered light guiding path communicating with the incident end 361 and the exit end 362. The incident end 361 is oriented to an exit end of the laser diode 25, and the exit end 362 extends toward the focal plane. The light guiding member 360 guides a laser beam incident through the incident end 361 as a slit beam S along the light guiding path.

The laser diode 25 is arranged close to the back side of the imaging unit 45. The light guiding member 360 is mounted to the imaging unit 45 in such a manner that the tapered light guiding path of the light guiding member 360 extends toward the front side of the imaging unit 45 (downwardly in FIG. 30) via the back side of the imaging unit 45. The mounting manner of the light guiding member 360 is not limited to the above. For example, part of the light guiding member 360 may be aligned with a side wall of the imaging unit 45.

In use of the measurement head H11, the laser beam emitted from the laser diode 25 is guided along the back side of the imaging unit 45 by the light guiding member 360, and is projected onto the focal plane as the slit beam S through the exit end 362 along the optical path having a great curvature. Thus, the slit beam S is projected onto the focal plane i.e. the measurement object with a sufficiently long slit length by passing along an extended optical path via the light guiding member 360.

(Description on Modifications)

In the foregoing description, various embodiments of the three-dimensional shape measuring device and the portable measuring device are described. The invention is not limited to the foregoing, but the following modifications (1) through (6) may be applied.

(1) The portable three-dimensional shape measuring device 1 may be provided with a display section such as a compact liquid crystal display device to display operation navigating information, a measuring status, a three-dimensional shape measurement result, or the like. The display section may preferably be provided in the head housing portion 11 or the intermediate housing portion 12 of the main body housing 10.

(2) In the embodiments, the measurement heads H1 through H11 each is incorporated in the portable three-dimensional shape measuring device 1. Alternatively, the measurement heads H1 through H11 each may be incorporated in e.g. a distal end of a hand of a measuring robot, a distal head of an industrial image guider, or a distal head of a medical endoscope.

(3) The head housing portion 11 of the main body housing 10 may be replaceable so that the measurement head in conformity with the measurement object may be detachably attached.

(4) In the embodiments, the grip portion G of the portable three-dimensional shape measuring device 1 has a rod-like shape. Alternatively, the grip portion may have an annular shape or a pistol-like shape. Also, the main body housing 10 may have a rectangular shape in plan view, a spherical shape, a cylindrical shape, or other shape, in place of the rod-like shape.

(5) In the embodiments, the light projecting optical system is operative to reflect a slit beam twice by using the X-direction mirror 312X (322X or 332X), and the X-direction relay mirror 313X (323X or 333X). Likewise, the light projecting optical system is operative to reflect a slit beam by using the Y-direction mirror 312Y (322Y or 332Y), and the Y-direction relay mirror 313Y (323Y or 333Y). In addition to this arrangement, other components such as a mirror or a prism may be disposed on the optical path to reflect a slit beam three times or more in order to further extend the optical path length. Alternatively, the X-direction relay mirror 313X (323X or 333X) and/or the Y-direction relay mirror 313Y (323Y or 333Y) may be omitted.

(6) In the embodiments, the X-direction mirror 312×(322X, 332X), and the Y-direction mirror 312Y (322Y or 332Y) are disposed farther from the light receiving plane of the image sensor, viewed from the measurement object. Alternatively, the X-direction mirror 312X (322X or 333X), and the Y-direction mirror 312Y (322Y or 332Y) may be disposed at a position substantially the same height as the light receiving plane of the image sensor.

The three-dimensional shape measuring device and the portable measuring device in the embodiments have the light projecting optical system with the extended optical path for guiding the slit beam toward the measurement object while passing the slit beam near the imaging unit. This is advantageous in extending the optical path length of the slit beam directed to the measurement object, thereby enabling to secure a sufficiently long length of the slit beam. Thus, the slit beam of the sufficiently long slit length free of distortion can be projected onto the measurement object, while securing miniaturization of the device. The arrangements of the invention are advantageous in providing a compact and high-performance light-section type three-dimensional shape measuring device, and a portable measuring device incorporated with the same.

The inventive three-dimensional shape measuring device and the inventive portable measuring device are useful in measuring three-dimensional shapes of various measurement objects, including measurement in industrial fields such as automobile industry, aviation industry, and architecture industry, measurement in medical fields such as dentistry and surgery, and measurement for the purpose of research in the biotechnology.

The following is a summary of the embodiments.

A three-dimensional shape measuring device according to an aspect of the invention is a three-dimensional shape measuring device for measuring a three-dimensional shape of a measurement object using a light section method. The device includes: a slit beam generator for generating a slit beam of a fan-like shape; a light projecting optical system for projecting the slit beam toward the measurement object; and an imaging section including a light receiving plane for forming light reflected on the measurement object including the slit beam, wherein the light projecting optical system includes an extended optical path for extending a slit length of the slit beam near the imaging section to a predetermined length.

In the above arrangement, the slit beam emitted from the slit beam generator is extended to the predetermined length along the extended optical path while passing around the imaging section for projection onto the measurement object. This enables to extend the optical path length from the slit beam generator to the measurement object i.e. the focal position, while securing miniaturization. This is advantageous in sufficiently extending the length of the slit beam without using a lens having a strong optical power.

Preferably, the light receiving plane of the imaging section may be disposed in parallel with a measurement plane.

In the light section method, it is essentially important to define an angle difference between the light projecting direction and the light receiving direction. In principle, as far as there is an angle difference between the light projecting direction and the light receiving direction, any arrangement may be applied. However, if the light receiving direction i.e. the light receiving plane is inclined with respect to the normal to the measurement surface, it is highly likely that a captured image may have a trapezoidal distortion or a focal displacement due to "aori" or shift photographing. This drawback can be eliminated by disposing the light receiving plane in the normal direction to the measurement surface, in other words, by disposing the light receiving plane in parallel with the measurement plane.

Preferably, the three-dimensional shape measuring device may further include: a light receiving optical system for forming the reflecting light on the light receiving plane, wherein a focal position of the slit beam by the slit beam generator and the light projecting optical system is coincident with a focal position on the light receiving plane by the light receiving optical system.

In the above arrangement, since the focal position of the slit beam defined by the light projecting optical system, and the focal position defined by the light receiving optical system are coincident with each other, the reflecting light can be detected in a focus state by focusing the slit beam on the measurement object. This is advantageous in enhancing the operability of the user.

Preferably, the extended optical path may include a reflecting plane for reflecting the slit beam, and the reflecting plane may be disposed substantially at the same height as the light receiving plane or farther from the light receiving plane, viewed from the measurement object.

In the above arrangement, the slit beam emitted from the slit beam generator is directed toward the measurement object after passing the reflecting plane disposed substantially at the same height as the light receiving plane or farther from the light receiving plane. This enables to extend the optical path length from the slit beam generator to the measurement object i.e. the focal position. This is advantageous in sufficiently extending the slit length of the slit beam without using a lens having a strong optical power.

Preferably, the imaging section may include an imaging unit having an image sensor with the light receiving plane, and a light receiving optical system for forming the reflecting light on the light receiving plane, the reflecting plane may be disposed near the imaging unit, and the extended optical path may be defined to guide the slit beam toward the reflecting plane while passing the slit beam around a back side or a lateral side of the imaging unit to project the slit beam onto the measurement object by way of reflection on the reflecting plane.

In the above arrangement, since the reflecting plane is disposed near the imaging unit, the measurement head can be miniaturized. Further, since the slit beam is guided to the reflecting plane while passing around the back side or the lateral side of the imaging unit for projection onto the measurement object. This enables to secure a sufficiently long optical path length to extend the slit beam.

Preferably, the extended optical path may include a reflecting plane for reflecting the slit beam, the imaging section may include an imaging unit having an image sensor with the light receiving plane, and a light receiving optical system for forming the reflecting light on the light receiving plane of the image sensor, and the reflecting plane may be defined to project the slit beam onto the measurement object in a direction away from a vicinity of the imaging unit in a planar direction on the light receiving plane.

In the above arrangement, after the slit beam is projected onto the measurement object in the direction away from the vicinity of the imaging unit in the planar direction on the light receiving plane of the image sensor, the slit beam is directed toward the measurement object by way of reflection on the reflecting plane. This is advantageously in securing a sufficiently long optical path length to extend the slit length of the slit beam while passing the slit beam around the imaging unit.

Preferably, the extended optical path may include a light guiding member for guiding the slit beam, the imaging section may include an imaging unit having an image sensor with the light receiving plane, and a light receiving optical system for forming the reflecting light on the light receiving plane, and the light guiding member may have such a shape as to project the slit beam onto the measurement object while passing the slit beam around a back side or a lateral side of the imaging unit.

In the above arrangement, the slit beam is guided while being passed around the back side or the lateral side of the imaging unit by the light guiding member for projection onto the measurement object. This is advantageous in securing a sufficiently long optical path length to extend the slit length of the slit beam while passing the slit beam around the imaging unit.

Preferably, the slit beam generator may generate multiple slit beams, and the extended optical path may include multiple reflecting planes for individually reflecting the slit beams to project the slit beams onto the measurement object in such a manner that projected slit images of the slit beams are formed on the measurement object in different directions from each other.

In the above arrangement, the slit beams can be projected onto the measurement object in different directions from each other. Thereby, the three-dimensional shape of the measurement object can be more accurately measured, based on the slit beams.

Preferably, the light projecting optical system may include a beam splitter for splitting one of the slit beams emitted from the slit beam generator into multiple slit beams.

In the above arrangement, since the beam splitter splits the one of the slit beams into multiple slit beams, the single slit beam generator is capable of generating the multiple slit beams. This contributes to cost reduction of the three-dimensional shape measuring device.

Preferably, the slit beam generator may generate a first slit beam and a second slit beam, and the light projecting optical system may project the first slit beam and the second slit beam onto the measurement object in such a manner that the first slit beam and the second slit beam intersect with each other at a position near a center of a light receiving area on the light receiving plane.

In the above arrangement, depthwise profiles of the measurement object in two different directions can be obtained by using the first and the second slit beams. Also, the user can confirm whether at least the light projecting optical system is in a focus state by checking whether the first and the second slit beams intersect with each other at the position near the center of the light receiving area. In other words, since the projected slit images can be used as a focus marker, the user is facilitated to perform a focusing operation. This is particularly useful in the case where the measurement object has no texture and has a low spatial frequency.

Preferably, the first slit beam and the second slit beam may be projected onto the measurement object in such a manner that an intersection angle defined by an optical axis of the first slit beam and a receiving optical axis of the light receiving plane is identical to an intersection angle defined by an optical axis of the second slit beam and the receiving optical axis of the light receiving plane.

In the above arrangement, since the intersection angle defined by the optical axis of the first slit beam and the receiving optical axis of the light receiving plane is made identical to the intersection angle defined by the optical axis of the second slit beam and the receiving optical axis of the light receiving plane. This enables to obtain depthwise profiles in two different directions with the same scale. This is advantageous in simplifying a computation to measure the three-dimensional shape of the measurement object.

A three-dimensional shape measuring device according to another aspect of the invention is a three-dimensional shape measuring device for measuring a three-dimensional shape of a measurement object using a light section method. The device includes: a light source; a slit beam projecting optical system for projecting light from the light source onto the measurement object as a slit beam of a fan-like shape; and an imaging unit including an image sensor having a light receiving plane for receiving light reflected on the measurement object including the slit beam, and a light receiving optical system for forming the reflecting light on the light receiving plane, wherein the light receiving plane of the image sensor is disposed in parallel with a measurement plane, the light source is arranged on a back side of the imaging unit, and the slit beam projecting optical system includes: a beam splitter, disposed on the back side of the imaging unit, to split the slit beam into a first slit beam and a second slit beam in different directions from each other; and a first reflector and a second reflector disposed near the imaging unit and at a position substantially the same height as the light receiving plane or farther from the light receiving plane, viewed from the measurement object, the first reflector being adapted to reflect the first slit beam toward the measurement object, and the second reflector being adapted to reflect the second slit beam toward the measurement object.

In the above arrangement, since the beam splitter splits the slit beam into the first slit beam and the second slit beam, the single light source is capable of generating the multiple slit beams. This contributes to cost reduction of the three-dimensional shape measuring device. Also, since the light receiving plane is disposed in parallel with the measurement plane, the three-dimensional shape measuring device is free of the aforementioned drawback resulting from "aori" or shift photographing. Further, the light source is disposed on the back side of the imaging unit, and the first slit beam and the second slit beam are directed toward the measurement object via the first and the second reflectors disposed near the imaging unit. This enables to extend the optical path length of the slit beam. This is advantageous in sufficiently extending the slit lengths of the first and the second slit beams without using a lens having a strong optical power.

Preferably, the three-dimensional shape measuring device may further include: a first relay reflector for reflecting the first slit beam reflected on the first reflector to project the first slit beam onto the measurement object at a predetermined angle inclined with respect to a receiving optical axis of the light receiving plane, and a second relay reflector for reflecting the second slit beam reflected on the second reflector to project the second slit beam onto the measurement object at a predetermined angle inclined with respect to the receiving optical axis of the light receiving plane.

In the above arrangement, the first relay reflector is disposed between the first reflector and the measurement object, and the second relay reflector is disposed between the second reflector and the measurement object. This enables to increase the latitude in designing the optical path, and extend the optical path length while securing miniaturization of the device.

Preferably, the image sensor may include a one-dimensional image sensor, and the imaging section may include a driving mirror for driving the light receiving optical system to scan a viewing area so as to sequentially guide the slit beams reflected on the measurement object to the one-dimensional image sensor.

In the above arrangement, since the driving mirror is used, the receiving optical axis can be bent by 90 degrees. This is advantageous in reducing the thickness of the measuring device.

A three-dimensional shape measuring device according to yet another aspect of the invention is a three-dimensional shape measuring device for measuring a three-dimensional shape of a measurement object using a light section method. The device includes: a first light source; a second light source; a first slit beam projecting optical system for projecting light from the first light source onto the measurement object as a first slit beam of a fan-like shape; a second slit beam projecting optical system for projecting light from the second light source onto the measurement object as a second slit beam of a fan-like shape; and an imaging unit including an image sensor having a light receiving plane for receiving light reflected on the measurement object including the slit beam, and a light receiving optical system for forming the reflecting light on the light receiving plane, wherein the light receiving plane of the image sensor is disposed in parallel with a measurement plane, the first light source and the second light source are arranged on a back side of the imaging unit in such a manner that the light from the first light source and the light from the second light source are irradiated in different directions from each other, the first slit beam projecting optical system includes a first reflector disposed near the imaging unit and at a position substantially the same height as the light receiving plane or farther from the light receiving plane, viewed from the measurement object, to reflect the first slit beam toward the measurement object, and the second slit beam projecting optical system includes a second reflector disposed near the imaging unit and at a position substantially the same height as the light receiving plane or farther from the light receiving plane, viewed from the measurement object, to reflect the second slit beam toward the measurement object.

In the above arrangement, since the light receiving plane is disposed in parallel with the measurement object, the three-dimensional shape measuring device is free of the aforementioned drawback resulting from "aori" or shift photographing. Also, the first and the second light sources are arranged on the back side of the imaging unit, and the first and the second slit beam are directed toward the measurement object via the first and the second reflectors disposed near the imaging unit. This enables to extend the optical path length. This is advantageous in sufficiently extending the lengths of the first and the second slit beam without using a lens having a strong optical power.

A three-dimensional shape measuring device according to a further aspect of the invention is a three-dimensional shape measuring device for measuring a three-dimensional shape of a measurement object using a light section method. The device includes: a light source; a slit beam projecting optical system for projecting light from the light source onto the measurement object as a slit beam of a fan-like shape; and an imaging unit including an image sensor having a light receiving plane for receiving light reflected on the measurement object including the slit beam, and a light receiving optical system for forming the reflecting light on the light receiving plane, wherein the light receiving plane of the image sensor is disposed in parallel with a measurement plane, the light source is arranged on a lateral side of the imaging unit to irradiate the light in a direction opposite to the measurement object, and the slit beam projecting optical system includes: a first reflecting plane disposed near the imaging unit and at a position substantially the same height as the light receiving plane or farther from the light receiving plane, viewed from the measurement object, to reflect the slit beam; and a second reflecting plane disposed at a position closer to the measurement object than the first reflecting plane to reflect the slit beam reflected on the first reflecting plane so as to project the slit beam onto the measurement object at a predetermined angle inclined with respect to a receiving optical axis of the light receiving plane.

In the above arrangement, since the light receiving plane is disposed in parallel with the measurement object, the three-dimensional shape measuring device is free of the aforementioned drawback resulting from "aori" or shift photographing. Also, the light source is arranged on the lateral side of the imaging unit to irradiate the light in the direction opposite to the measurement object, and the slit beam is directed toward the measurement object via the first and the second reflectors disposed near the imaging unit. This enables to extend the optical path length. This is advantageous in sufficiently extending the length of the slit beam without using a lens having a strong optical power.

A portable measuring device according to still another aspect of the invention is a portable measuring device including: a grip portion having such a shape as to be held by a user; a measurement head integrally attached to the grip portion; and the three-dimensional shape measuring device incorporated in the measurement head.

The above arrangement enables to realize a handy portable measuring device constructed such that the compact three-dimensional shape measuring device is incorporated in the measurement head. The portable measuring device provides a high degree of freedom in securing a position for measuring the three-dimensional shape of the measurement object, and is advantageous in non-contactly and non-destructively measuring the three-dimensional shape of the measurement object including a soft object and a poisonous object, not to mention a solid object.

In the above arrangement, preferably, the grip portion may have a rod-like shape, and the measurement head may be integrally mounted on one end of the grip portion.

In the above arrangement, the user is allowed to operate the portable measuring device constructed such that the three-dimensional shape measuring device is incorporated in the measurement head, with an operability like operating a caliper or a micrometer, while holding the rod-shaped grip portion.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A three-dimensional shape measuring device for measuring a three-dimensional shape of a measurement object using a light section method, the device comprising:
   a slit beam generator for generating a slit beam of a fan-like shape;
   a light projecting optical system for projecting the slit beam toward the measurement object; and
   an imaging section including a light receiving plane for forming light reflected on the measurement object including the slit beam, wherein
   the light projecting optical system includes an extended optical path for extending a slit length of the slit beam near the imaging section to a predetermined length.

2. The three-dimensional shape measuring device according to claim 1, wherein
   the light receiving plane of the imaging section is disposed in parallel with a measurement plane.

3. The three-dimensional shape measuring device according to claim 1, further comprising:
   a light receiving optical system for forming the reflecting light on the light receiving plane, wherein
   a focal position of the slit beam by the slit beam generator and the light projecting optical system is coincident with a focal position on the light receiving plane by the light receiving optical system.

4. The three-dimensional shape measuring device according to claim 1, wherein
   the extended optical path includes a reflecting plane for reflecting the slit beam, and
   the reflecting plane is disposed substantially at the same height as the light receiving plane or farther from the light receiving plane, viewed from the measurement object.

5. The three-dimensional shape measuring device according to claim 4, wherein
   the imaging section includes an imaging unit having an image sensor with the light receiving plane and a light receiving optical system for forming the reflecting light on the light receiving plane,
   the reflecting plane is disposed near the imaging unit, and
   the extended optical path is defined to guide the slit beam toward the reflecting plane while passing the slit beam around a back side or a lateral side of the imaging unit to project the slit beam onto the measurement object by way of reflection on the reflecting plane.

6. The three-dimensional shape measuring device according to claim 4, wherein
   the slit beam generator generates multiple slit beams, and
   the extended optical path includes multiple reflecting planes for individually reflecting the slit beams to project the slit beams onto the measurement object in such a manner that projected slit images of the slit beams are formed on the measurement object in different directions from each other.

7. The three-dimensional shape measuring device according to claim 6, wherein
   the light projecting optical system includes a beam splitter for splitting one of the slit beams emitted from the slit beam generator into multiple slit beams.

8. The three-dimensional shape measuring device according to claim 6, wherein
   the slit beam generator generates a first slit beam and a second slit beam, and
   the light projecting optical system projects the first slit beam and the second slit beam onto the measurement object in such a manner that the first slit beam and the second slit beam intersect with each other at a position near a center of a light receiving area on the light receiving plane.

9. The three-dimensional shape measuring device according to claim 8, wherein
   the first slit beam and the second slit beam are projected onto the measurement object in such a manner that an intersection angle defined by an optical axis of the first slit beam and a receiving optical axis of the light receiving plane is identical to an intersection angle defined by an optical axis of the second slit beam and the receiving optical axis of the light receiving plane.

10. The three-dimensional shape measuring device according to claim 1, wherein
    the extended optical path includes a reflecting plane for reflecting the slit beam,
    the imaging section includes an imaging unit having an image sensor with the light receiving plane, and a light receiving optical system for forming the reflecting light on the light receiving plane of the image sensor, and
    the reflecting plane is defined to project the slit beam onto the measurement object in a direction away from a vicinity of the imaging unit in a planar direction on the light receiving plane.

11. The three-dimensional shape measuring device according to claim 1, wherein
    the extended optical path includes a light guiding member for guiding the slit beam,
    the imaging section includes an imaging unit having an image sensor with the light receiving plane, and a light receiving optical system for forming the reflecting light on the light receiving plane, and
    the light guiding member has such a shape as to project the slit beam onto the measurement object while passing the slit beam around a back side or a lateral side of the imaging unit.

12. A three-dimensional shape measuring device for measuring a three-dimensional shape of a measurement object using a light section method, the device comprising:
    a light source;
    a slit beam projecting optical system for projecting light from the light source onto the measurement object as a slit beam of a fan-like shape; and an imaging unit including an image sensor having a light receiving plane for receiving light reflected on the measurement object including the slit beam, and a light receiving optical system for forming the reflecting light on the light receiving plane, wherein the light receiving plane of the image sensor is disposed in parallel with a measurement plane, the light source is arranged on a back side of the imaging unit, and the slit beam projecting optical system includes:

a beam splitter, disposed on the back side of the imaging unit, to split the slit beam into a first slit beam and a second slit beam in different directions from each other; and a first reflector and a second reflector disposed near the imaging unit and at a position substantially the same height as the light receiving plane or farther from the light receiving plane, viewed from the measurement object, the first reflector being adapted to reflect the first slit beam toward the measurement object, and the second reflector being adapted to reflect the second slit beam toward the measurement object.

13. The three-dimensional shape measuring device according to claim 12, further comprising:

a first relay reflector for reflecting the first slit beam reflected on the first reflector to project the first slit beam onto the measurement object at a predetermined angle inclined with respect to a receiving optical axis of the light receiving plane, and a second relay reflector for reflecting the second slit beam reflected on the second reflector to project the second slit beam onto the measurement object at a predetermined angle inclined with respect to the receiving optical axis of the light receiving plane.

14. The three-dimensional shape measuring device according to claim 12, wherein the image sensor includes a one-dimensional image sensor, and the imaging section includes a driving mirror for driving the light receiving optical system to scan a viewing area so as to sequentially guide the slit beams reflected on the measurement object to the one-dimensional image sensor.

15. A portable measuring device, comprising:

a grip portion having such a shape as to be held by a user;

a measurement head integrally attached to the grip portion; and a three-dimensional shape measuring device incorporated in the measurement head, wherein the three-dimensional shape measuring device is adapted to measure a three-dimensional shape of a measurement object using a light section method, the three-dimensional shape measuring device including:

a slit beam generator for generating a slit beam of a fan-like shape;

a light projecting optical system for projecting the slit beam toward the measurement object; and an imaging section including a light receiving plane for forming light reflected on the measurement object including the slit beam, wherein the light projecting optical system includes an extended optical path for extending a slit length of the slit beam near the imaging section to a predetermined length.

16. The portable measuring device according to claim 15, wherein the grip portion has a rod-like shape, and the measurement head is integrally mounted on one end of the grip portion.

* * * * *